United States Patent
Akkarakaran et al.

(10) Patent No.: US 11,297,589 B2
(45) Date of Patent: Apr. 5, 2022

(54) SYSTEMS AND METHODS FOR NETWORK PROCEDURES FOR ON-DEMAND RANDOM ACCESS CHANNEL (RACH)

(71) Applicant: QUALCOMM Incorporated, San Diego, CA (US)

(72) Inventors: Sony Akkarakaran, Poway, CA (US); Tao Luo, San Diego, CA (US); Gavin Bernard Horn, La Jolla, CA (US); Sven Fischer, Nuremberg (DE); Alexandros Manolakos, San Diego, CA (US); Joseph Binamira Soriaga, San Diego, CA (US); Guttorm Ringstad Opshaug, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/554,342

(22) Filed: Aug. 28, 2019

(65) Prior Publication Data
US 2020/0107286 A1 Apr. 2, 2020

Related U.S. Application Data

(60) Provisional application No. 62/738,963, filed on Sep. 28, 2018.

(51) Int. Cl.
*H04W 24/00* (2009.01)
*H04W 64/00* (2009.01)
(Continued)

(52) U.S. Cl.
CPC ........... *H04W 64/00* (2013.01); *H04L 5/0048* (2013.01); *H04L 41/08* (2013.01); *H04W 74/0833* (2013.01)

(58) Field of Classification Search
CPC ....... H04W 64/00; H04W 4/029; H04W 4/02; H04W 64/003; H04W 74/0833;
(Continued)

(56) References Cited

U.S. PATENT DOCUMENTS

| | | | | |
|---|---|---|---|---|
| 2012/0309376 | A1* | 12/2012 | Huang | H04M 1/72572 455/418 |
| 2015/0181366 | A1* | 6/2015 | Chae | H04W 72/048 370/336 |

(Continued)

FOREIGN PATENT DOCUMENTS

| | | |
|---|---|---|
| WO | 2015192113 A1 | 12/2015 |
| WO | 2018107380 A1 | 6/2018 |

OTHER PUBLICATIONS

International Preliminary Report on Patentability—PCT/US2019/048844, The International Bureau of WIPO—Geneva, Switzerland, dated Apr. 8, 2021.
(Continued)

*Primary Examiner* — Khalid W Shaheed
(74) *Attorney, Agent, or Firm* — Patterson & Sheridan, LLP

(57) ABSTRACT

Certain aspects of the present disclosure relate to methods and apparatus for on-demand positioning. For example a method may include transmitting a request to participate in a UE positioning procedure, wherein the request indicates one or more parameters to be used by a location server in coordinating one or more base stations (BSs) to participate in the UE positioning procedure, and receiving signaling from the location server configuring the UE to participate in the UE positioning procedure.

34 Claims, 18 Drawing Sheets

(51) Int. Cl.
*H04L 5/00* (2006.01)
*H04L 41/08* (2022.01)
*H04W 74/08* (2009.01)

(58) Field of Classification Search
CPC ... H04L 5/0007; H04L 5/0048; H04L 5/0053; H04L 5/0096; G01S 5/0236; G01S 5/10
See application file for complete search history.

(56) References Cited

U.S. PATENT DOCUMENTS

| | | | |
|---|---|---|---|
| 2015/0296359 A1* | 10/2015 | Edge | G01S 1/20 455/404.2 |
| 2016/0128029 A1* | 5/2016 | Yang | H04L 27/2627 370/329 |
| 2017/0339516 A1* | 11/2017 | Edge | G01S 1/04 |
| 2018/0167775 A1* | 6/2018 | Tian | H04W 64/00 |
| 2018/0220392 A1 | 8/2018 | Ly | |
| 2018/0299561 A1* | 10/2018 | Jau | G01S 19/256 |
| 2020/0028648 A1* | 1/2020 | Akkarakaran | G01S 1/042 |
| 2020/0274680 A1* | 8/2020 | Werner | H04L 5/0048 |

OTHER PUBLICATIONS

International Search Report and Written Opinion—PCT/US2019/048844—ISA/EPO—dated Nov. 14, 2019.

* cited by examiner

SYSTEMS AND METHODS FOR NETWORK PROCEDURES FOR ON-DEMAND RANDOM ACCESS CHANNEL (RACH)

CROSS-REFERENCE TO RELATED APPLICATION

This application claims benefit of and priority to U.S. Provisional Patent Application Ser. No. 62/738,963, filed Sep. 28, 2018, entitled "Systems and Methods for Network Procedures for On-Demand Random Access Channel (RACH)," which is assigned to the assignee hereof and incorporated herein by reference in its entirety as if fully set forth below and for all applicable purposes.

BACKGROUND

Field of the Disclosure

The present disclosure relates generally to communication systems, and more particularly, to methods and apparatus for network procedures for on-demand random access channel (RACH) in communications systems operating according to new radio (NR) technologies.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes transmitting a request to participate in a UE positioning procedure, wherein the request indicates one or more parameters to be used by a location server in coordinating one or more base stations to participate in the UE positioning procedure, and receiving signaling from the location server configuring the UE to participate in the UE positioning procedure.

Certain aspects provide a method for wireless communication by a base station. The method generally includes receiving, from a user equipment (UE), a request to participate in a UE positioning procedure, wherein the request indicates one or more parameters to be used in the UE positioning procedure, and transmitting a response to the UE, wherein the response includes configuration information for participating in the UE positioning procedure.

Certain aspects provide an apparatus for wireless communication by a user equipment (UE). The apparatus includes a processor, a transceiver communicatively coupled to the processor, and a memory communicatively coupled to the processor. In some examples, the processor is configured to transmit, via the transceiver, a request to participate in a UE positioning procedure, wherein the request indicates one or more parameters to be used by a location server in coordinating one or more base stations (BSs) to participate in the UE positioning procedure, and receive, via the transceiver, signaling from the location server configuring the UE to participate in the UE positioning procedure.

Certain aspects provide an apparatus for wireless communication by a network entity. The apparatus includes a processor, one or more of a transceiver or a network interface communicatively coupled to the processor, and a memory communicatively coupled to the processor. In some examples, the processor is configured to receive, from a user equipment (UE), a request to participate in a UE positioning procedure, wherein the request indicates one or more parameters to be used in the UE positioning procedure. In some examples the processor is configured to configure, in response to the request, one or more base stations (BSs) to participate in the UE positioning procedure with the UE, and transmit a response to the UE, wherein the response includes configuration information for participating in the UE positioning procedure.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
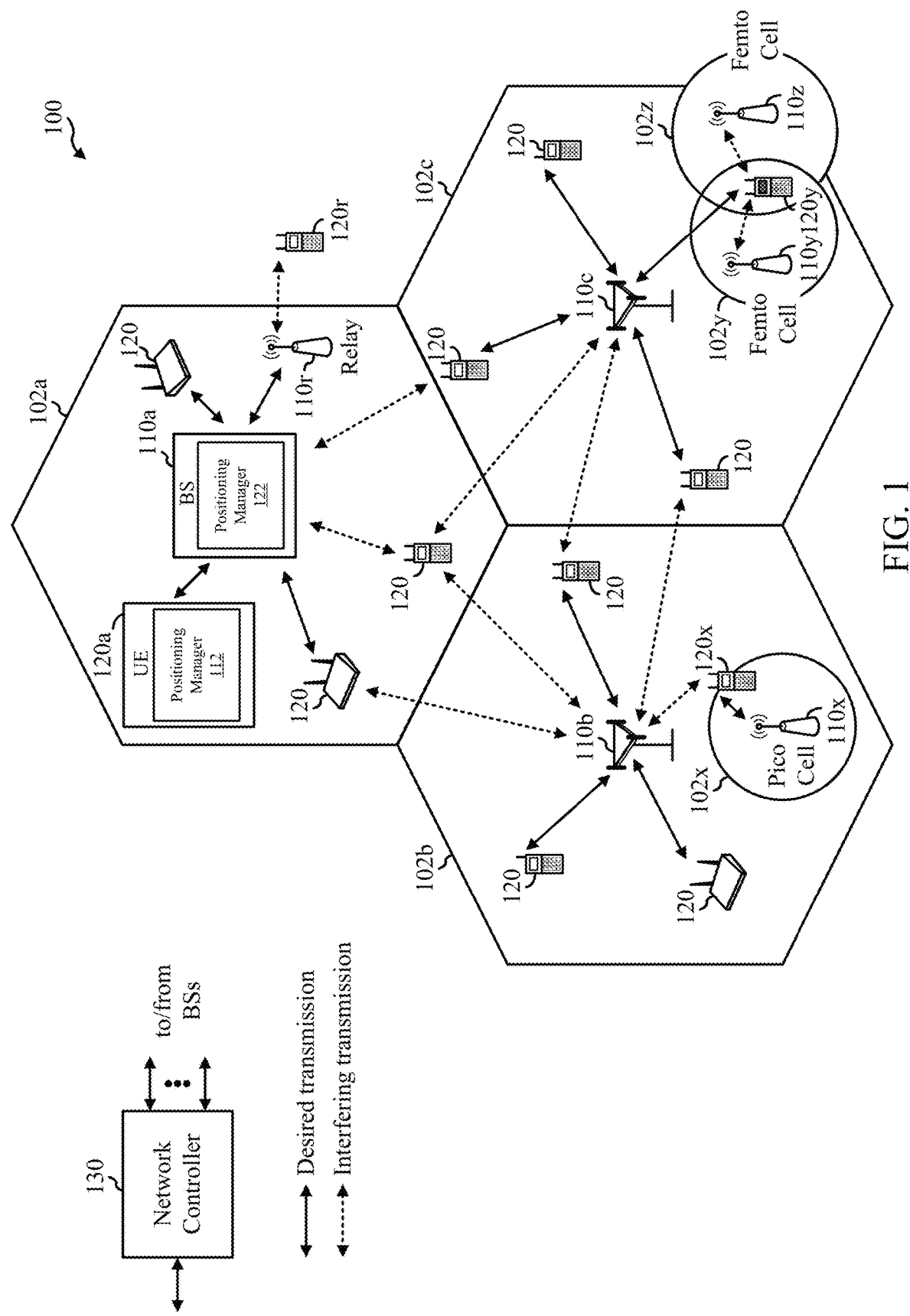
FIG. 1 is a system diagram conceptually illustrating an example telecommunications system, in accordance with certain aspects of the present disclosure.

Aspects of the present disclosure provide apparatus, methods, processing systems, and computer readable mediums for providing a user equipment (UE) with an ability to participate in a positioning procedure.

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

According to certain aspects, the BSs 110 and UEs 120 may be configured for providing a UE (e.g., UE 120a) with a capability for participating in a positioning procedure. As shown in FIG. 1, the BS 110a includes a positioning manager 122. The positioning manager 122 may be configured to receive, from the UE 120a, a request to participate in a UE positioning procedure, wherein the request indicates one or more parameters to be used in the positioning procedure, in accordance with aspects of the present disclosure. In some examples, the positioning manager 122 may transmit a response to the UE 120a, wherein the response includes configuration information for participating in the positioning procedure. As shown in FIG. 1, the UE 120a includes a positioning manager 112. The positioning manager 112 may be configured to transmit a request to participate in a positioning procedure, wherein the request indicates one or more parameters to be used by a location server in coordinating one or more base stations to participate in the positioning procedure, in accordance with aspects of the present disclosure. In some examples, the positioning manager 112 may receive signaling from the location server configuring the UE 120a to participate in the positioning procedure.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
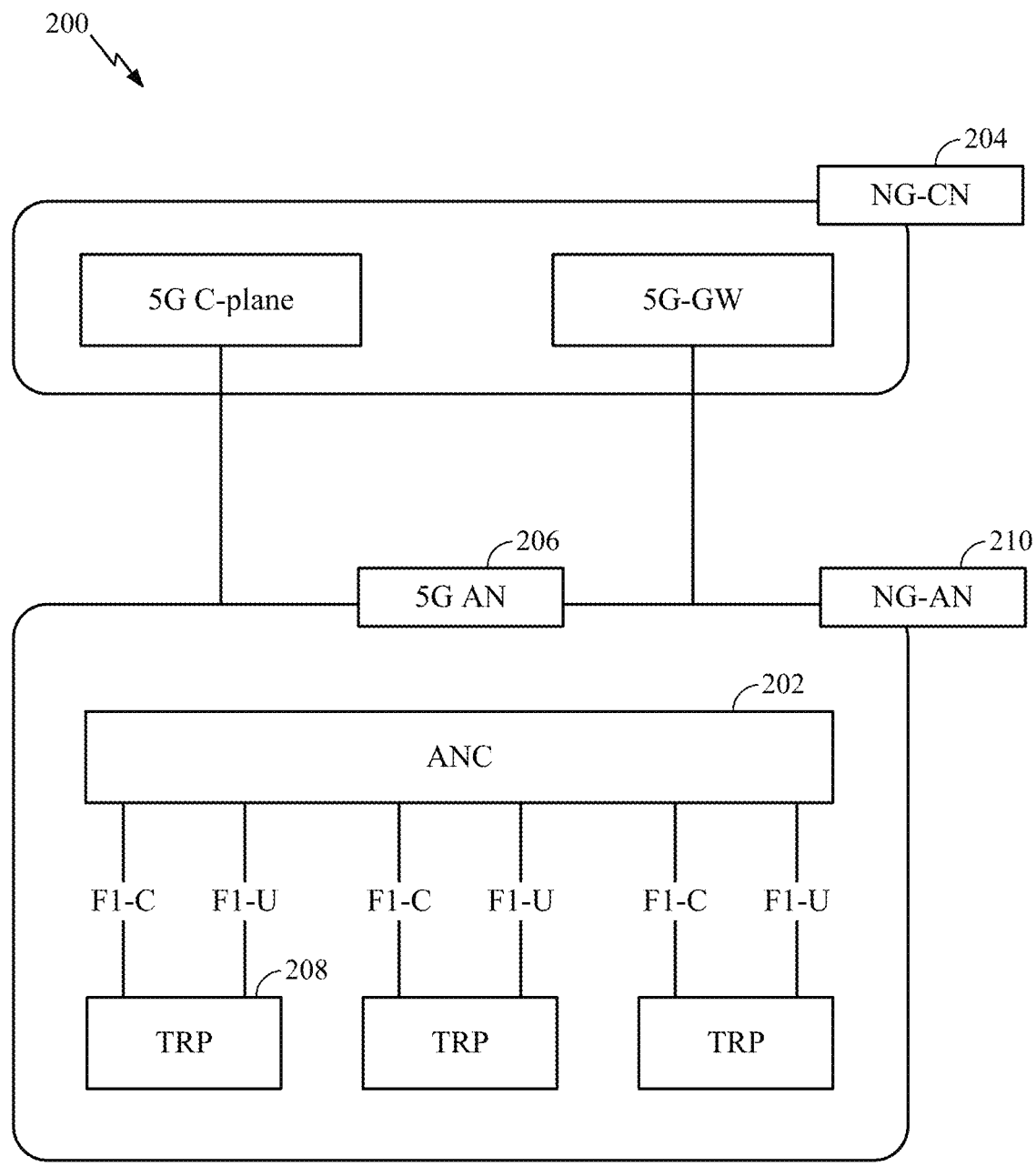
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The distributed RAN 200 may support fronthauling solutions across different deployment types. For example, the architecture of the RAN may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
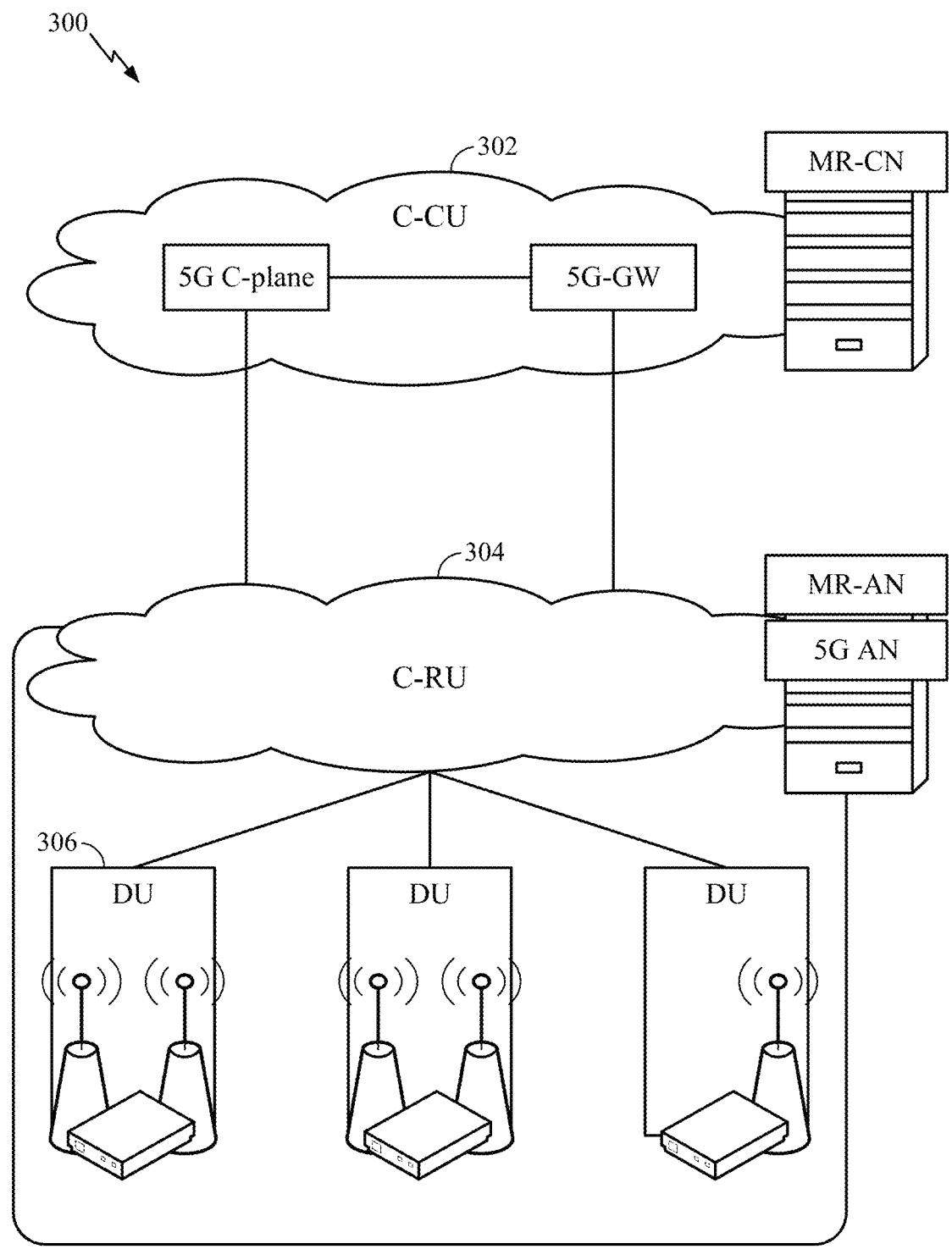
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
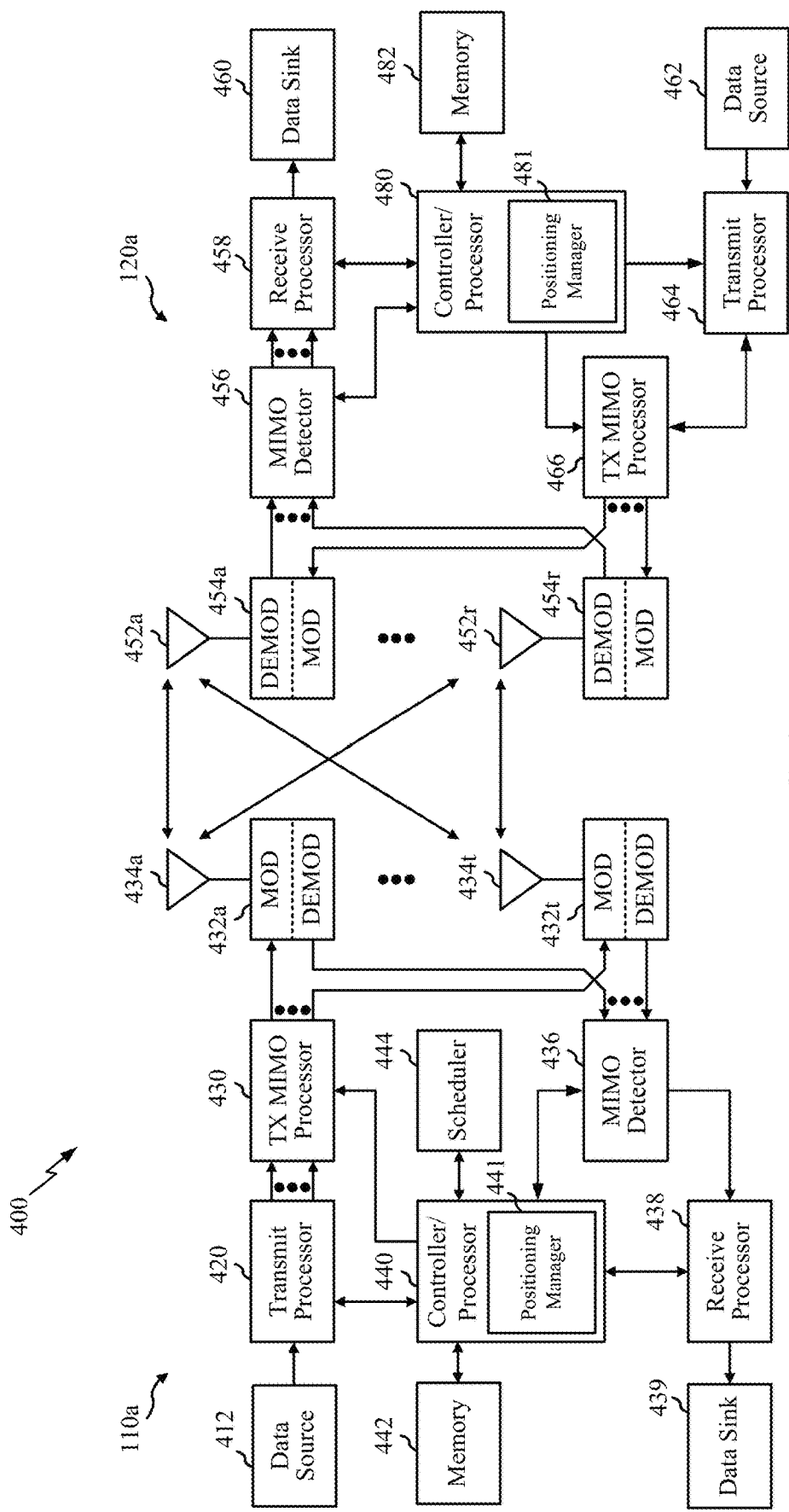
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, transceivers that includes antennas 452, processors 466, 458, 464, and/or controller/processor 480 of the UE 120 and/or transceivers that include antennas 434, processors 430, 420, 438, and/or controller/processor 440 of the BS 110 may be used to perform the operations described herein and illustrated with reference to FIGS. 10 and 11.

FIG. 4 shows a block diagram of a design 400 of a BS 110a and a UE 120a, which may be one of the BSs and one of the UEs in FIG. 1. 1.The base station 110a may be equipped with antennas 434a through 434t, and the UE 120a may be equipped with antennas 452a through 452r.

At the base station 110a, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for reference signal (RS) multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted using a transceiver, for example, via the antennas 434a through 434t, respectively.

At the UE 120a, one or more transceivers that include the antennas 452a through 452r may receive the downlink signals from the base station 110a and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120a to a data sink 460, and provide decoded control information to a controller/processor 480. According to one or more cases, aspects can include providing the antennas, as well as some Tx/Rx functionalities, such that they reside in distributed units. For example, some Tx/Rx processing can be done in the central unit, while other processing can be done at the distributed units. For example, in accordance with one or more aspects as shown in the diagram, the BS mod/demod 432 may be in the distributed units.

On the uplink, at the UE 120a, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110a. At the BS 110, the uplink signals from the UE 120a may be received by the antennas 434, processed by the modulators 432, detected by a MIMO detector 436 if applicable, and further processed by a receive processor 438 to obtain decoded data and control information sent by the UE 120a. The receive processor 438 may provide the decoded data to a data sink 439 and the decoded control information to the controller/processor 440.

The controllers/processors 440 and 480 may direct the operation at the base station 110a and the UE 120a, respectively. The controller/processor 440 and/or other processors and modules at the base station 110 may perform or direct, e.g., the execution of the functional blocks illustrated in FIGS. 10 and 11, and/or other processes for the techniques described herein. The controller/processor 480 and/or other processors and modules at the UE 120a may also perform or direct processes for the techniques described herein. The memories 442 and 482 may store data and program codes for the BS 110a and the UE 120a, respectively. A scheduler 444 may schedule UEs for data transmission on the downlink and/or uplink.

The controller/processor 480 and/or other processors and modules at the UE 120a may perform or direct the execution of processes for the techniques described herein. For example, as shown in FIG. 4, the controller/processor 440 of the BS 110a has a positioning manager 441 that may be configured for receiving, from the UE 120a, a request to participate in a UE positioning procedure, wherein the request indicates one or more parameters to be used in the positioning procedure, and transmitting a response to the UE 120a, wherein the response includes configuration information for participating in the positioning procedure, according to aspects described herein. As shown in FIG. 4, the controller/processor 480 of the UE 120a has a positioning manager 481 that may be configured for transmitting a request to participate in a positioning procedure, wherein the request indicates one or more parameters to be used by a location server in coordinating one or more base stations to participate in the positioning procedure, and receiving signaling from the location server configuring the UE 120a to participate in the positioning procedure, according to aspects described herein. Although shown at the controller/processor, other components of the UE 120a and BS 110a may be used performing the operations described herein.

Figure 5:
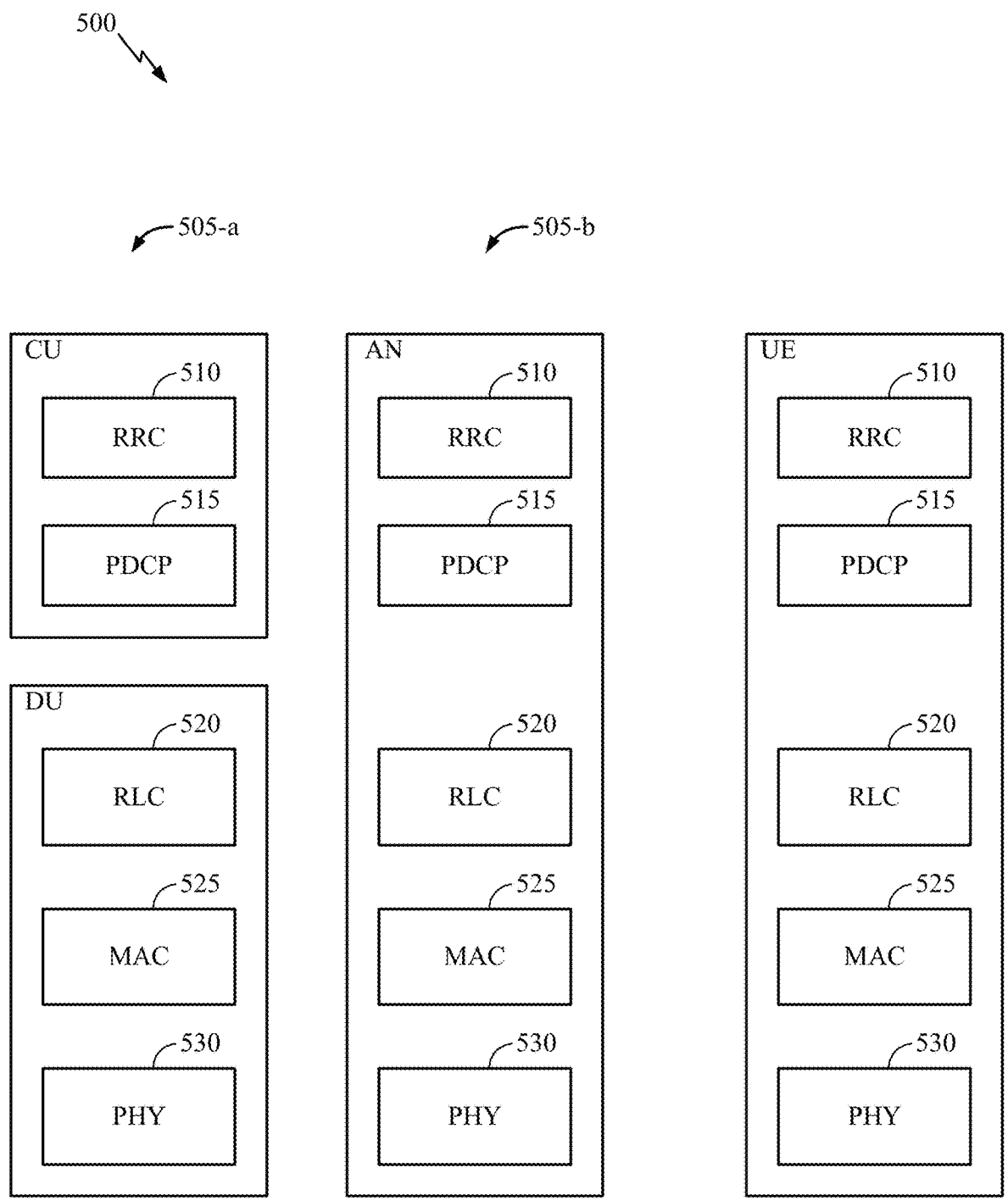
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505a shows a split implementation of a protocol stack, in which implementation of the protocol stack is split between a centralized network access device (e.g., an ANC 202 in FIG. 2) and distributed network access device (e.g., DU 208 in FIG. 2). In the first option 505a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505a may be useful in a macro cell, micro cell, or pico cell deployment.

A second option 505b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
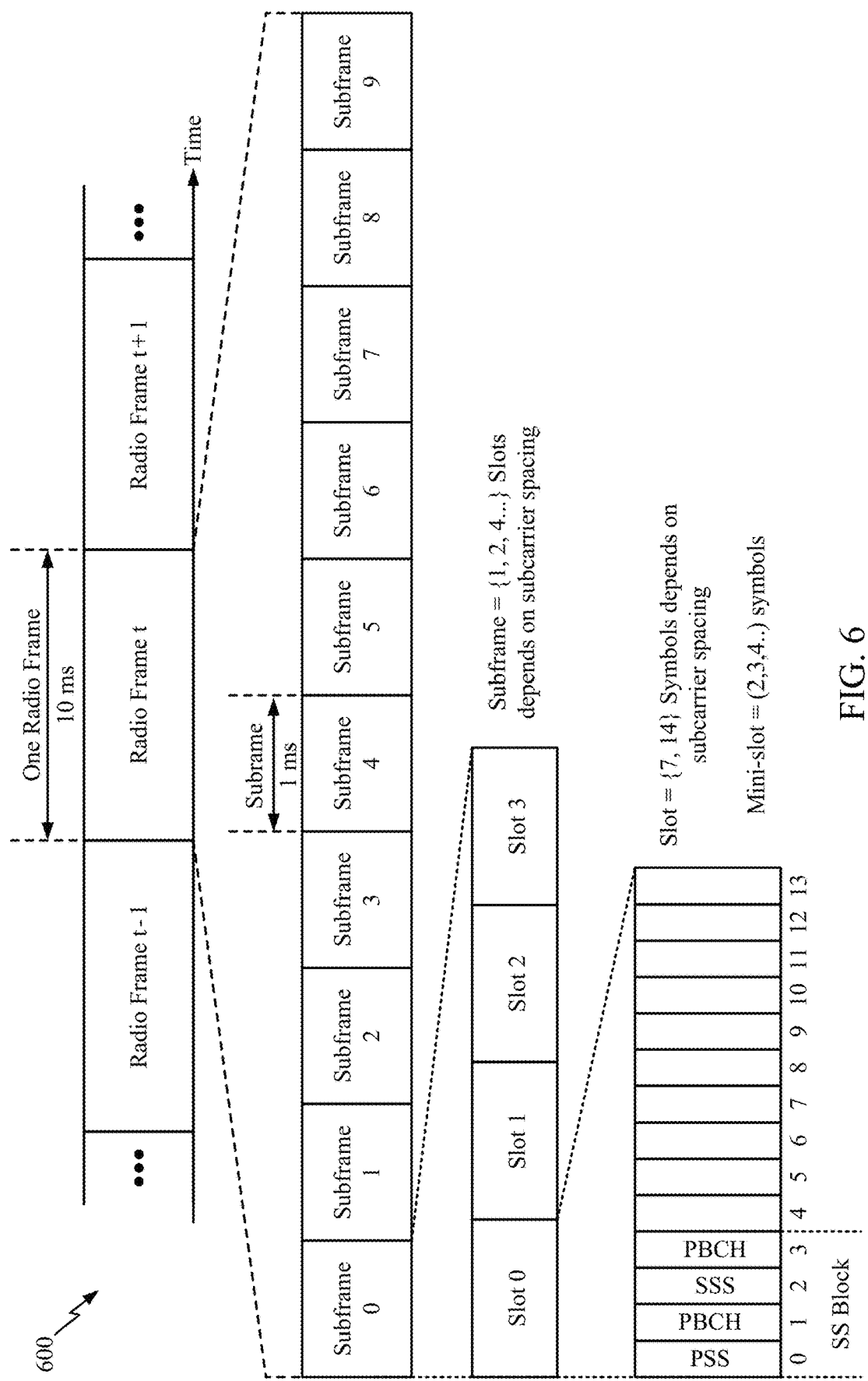
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 4, or 7 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The SS may provide the CP length and frame timing. The PSS and SSS may provide the cell identity. The PBCH carries some basic system information, such as system frame number, subcarrier spacing in SIB1, Msg.2/4 for initial access and broadcast SI-messages, cell barring information, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Examples of UE Positioning

According to aspects, and as will be described in more detail herein, multiple base stations (BSs) (e.g., Node Bs, TRPs, APs) of a wireless network may communicate with a UE. Further, in such communications, multiple BSs may be geographically separated from each other as well as the UE. The geographical position of the UE may often be determined in order to provide and improve communications between the base stations and the UE.

Positioning reference signals (PRSs) were introduced in LTE Release 9 to assist in determining the location of User Equipment (UE) based on radio access network information. In general, PRS signals may be transmitted within pre-defined bandwidth and according to a set of configuration parameters such as subframe offset, periodicity, and duration. The PRS bandwidth may be configurable on a per-cell basis, where 1.4, 3, 5, 10, 15, and 20 MHz bandwidths are supported. However, regardless of the bandwidth, PRS may be transmitted in the center resource blocks of a given bandwidth. Additionally, in some cases, PRS periodicity may be fixed such that all repetitions of PRS use the same bandwidth.

Further, each cell may apply a different muting pattern (defining times where the cell does not transmit PRS) in an effort to avoid interference with PRS transmitted from other cells. PRS may be transmitted at pre-defined subframes and repeated (e.g., in several consecutive subframes, with each set of subframes referred to as a "positioning occasion"). The sequence transmitted as a PRS may be based on any suitable known sequence. PRS from different cells may be multiplexed in the code domain (e.g., each cell transmitting a different (orthogonal) PRS sequence), in the frequency domain (e.g., at different frequency offsets), and/or in the time domain (e.g., using time based blanking).

As noted above, PRSs may be used in determining the location of UE, for example, based on radio access network information. The process of determining the location of a UE follows three major steps. For example, a UE may first receive PRSs from its serving cell and neighboring cells. Based on the received PRSs, the UE may measure observed time difference of arrival (OTDOA) and report a reference signal time difference (RSTD) measurement to its serving cell. The network may then use the RTSD measurement to calculate the longitude and latitude of the UE.

Figure 7:
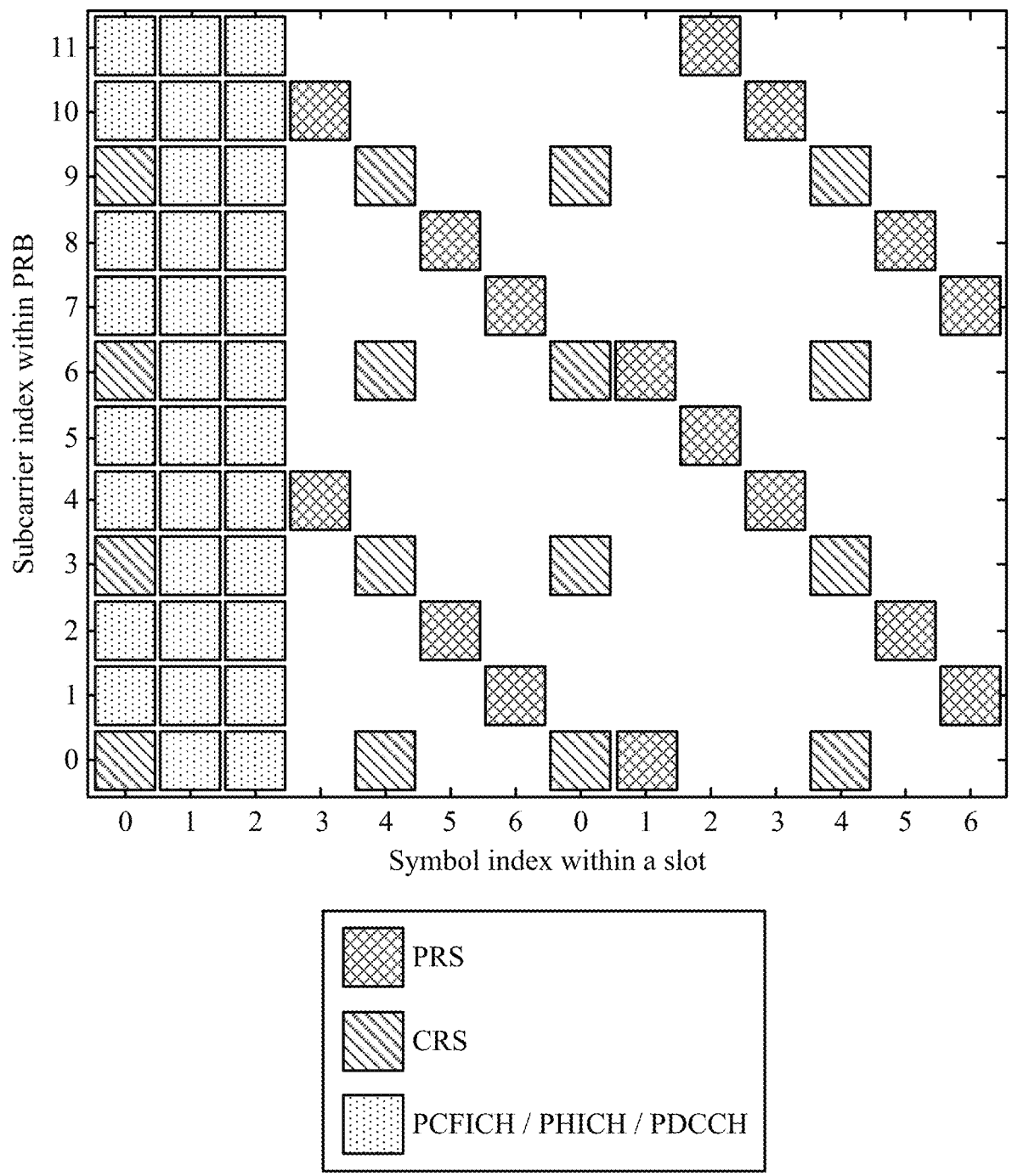
FIG. 7 illustrates an example subframe configuration scenario, in which aspects of the present disclosure may be practiced.

A specific example of a traditional LTE UE positioning reference signal (RS) scenario is shown in FIG. 7. Particularly, FIG. 7 shows an example subframe configuration for LTE UE positioning RS (PRS). FIG. 7 shows an example CRS pattern, an example PRS pattern, and example PCFICH, PHICH, and PDCCH patterns.

In this example of LTE UE Positioning RS, a PRS can be broadcast periodically with a PRS periodicity of 160, 320, 640, and/or 1280 ms. The PRS may be generated similarly to CRS in this scenario as shown. For example, a seed for a PN sequence generator may depend on a slot index, a symbol index, and a cell ID. Frequency reuse may also be provided by providing, for example, six possible diagonal frequency shift patterns, staggering PRS REs to reduce PRS collision, and by avoiding PRS collision by, for example, setting cell 0 to have the identical PRS as cell 6. In this example subframes (1, 2) and (4, 6) are considered consecutive subframes. Some features of this LTE UE positioning RS scenario can include no data transmission in RBs comprising PRS for low interference, eNBs being synchronized, as well as PRS muting to improve detectability defined as an ability to detect weak cell transmissions.

Example on-Demand UE Positioning

In one or more aspects of embodiments described herein, in NR UE positioning, reference signals and physical channels (with the possible exception of synchronization signals, PBCH/MIB, and/or PDSCH carrying MSIB) may be transmitted on-demand or event-triggered. This may have several advantages, for example, for network energy savings, or for improved efficiency of resource utilization, or for lower latency of positioning. In NR UE positioning a UE may use synchronization signals for UE positioning. Currently, periodic PRS transmission takes resources from data scheduling. Accordingly, periodic PRS transmission may be limited to provide more resources for data scheduling. Accordingly, there may be latency caused by having to wait for next instance of PRS. In contrast, with an on-demand embodiment, a request can be made for a burst of PRS 'in between' the broadcast PRS periods.

Figure 8:
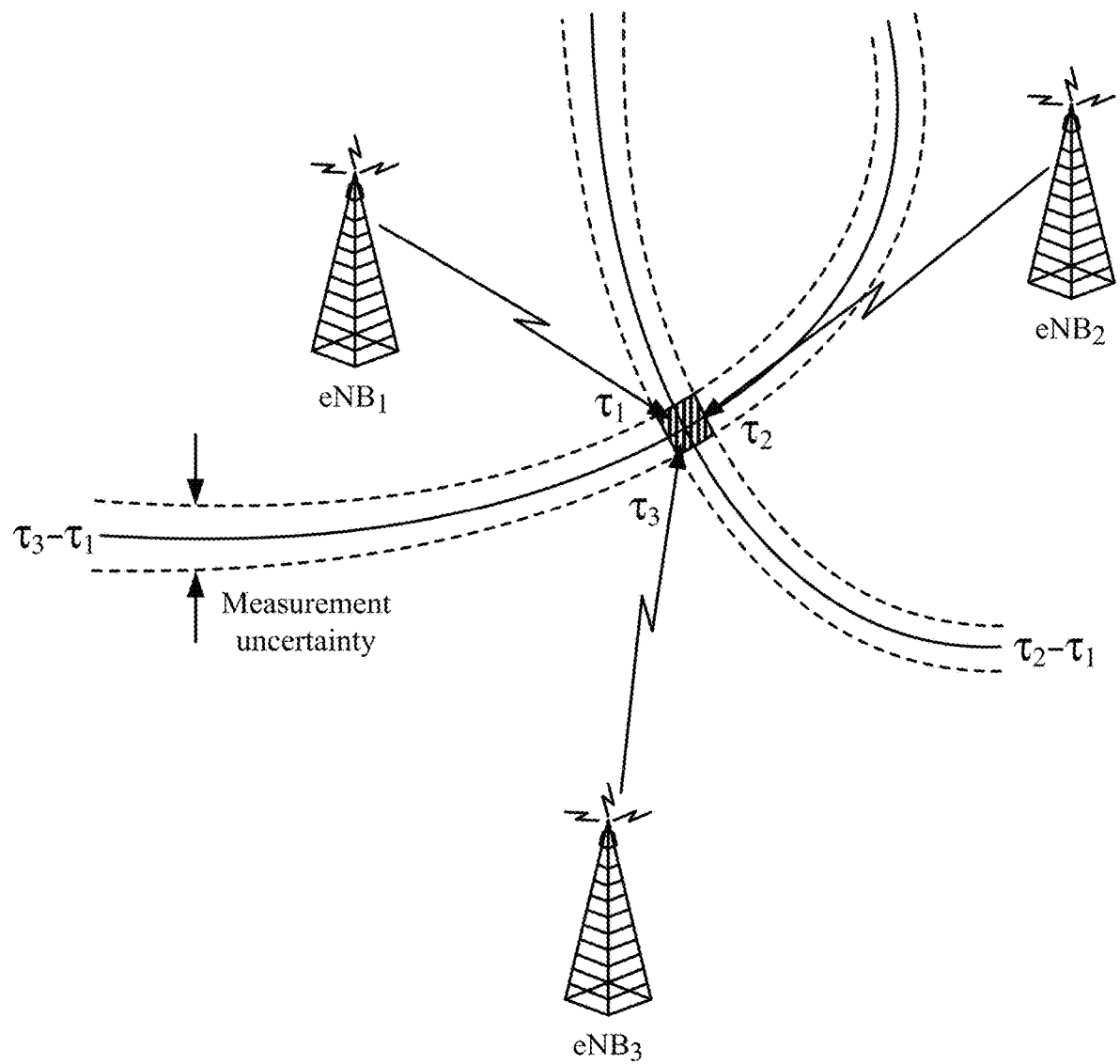
FIG. 8 illustrates an example positioning scenario, in which aspects of the present disclosure may be practiced.

As shown in FIG. 8, curves may be defined in which a measured difference in arrival time of a reference signal (transmitted at the same time) from two base stations (e.g., eNB1 and eNB2 or eNB1 and eNB3) at the same UE is the same. In other words, at any point along such a curve, the difference in time of arrival (TDOA) should be the same. By finding the intersection between three or more such curves (for three or more different pairs of eNBs), a fairly accurate estimate of UE position may be determined.

However, in some cases it may not be guaranteed that the UE may detect arrival times of at least three base stations' transmissions, as shown in FIG. 8, to estimate the UE's location. Accordingly, a reference signal and procedures may be introduced to support UE positioning while also providing network energy savings.

In accordance with one or more aspects, one or more on-demand positioning procedures for NR may be defined. For example, on-demand downlink (DL) based UE positioning may be provided. Similarly, on-demand uplink (UL) based UE positioning may be provided. According to one or more cases, network signals may be provided that may indicate UE positioning capability in system information (e.g., a capability signaling message). An example of the UE positioning capabilities that can be indicated may include, for example, whether on-demand UE positioning is supported instead of broadcast positioning reference signal (PRS). Another UE positioning capability that may be indicated may include on-demand DL-based UE positioning or On-demand UL-based UE positioning.

Figure 9:
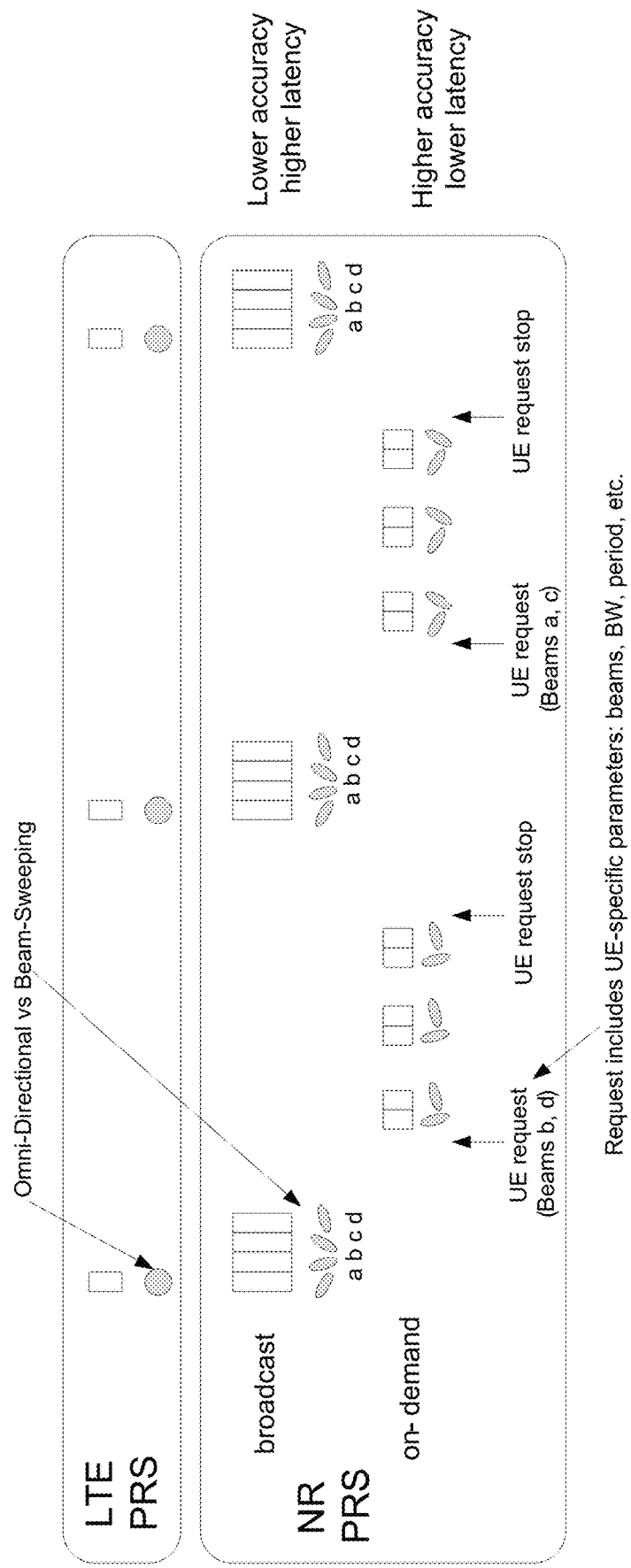
FIG. 9 illustrates example broadcast PRS, in accordance with aspects of the present disclosure.

FIG. 9 illustrates examples of different PRS, in accordance with aspects of the present disclosure. As shown, LTE PRS can be broadcast using an Omni-directional beam signal using one symbol. In NR, the NR PRS broadcast can be done using beam-sweeping. As shown, when using beam-sweeping each of the beam transmissions may use a different symbol. Accordingly, it can be appreciated that in some cases NR PRS overhead resource usage may include a number of symbols and beams. This may be especially true, for example, in a millimeter wave frequency range (FR2) when beam-sweeping may be needed.

Accordingly, there may be a desire to reduce overhead of broadcast PRS, for example, in FR2 when beam sweeping is used. There may also be a desire to reduce latency of positioning acquisition which may help avoid having to wait for the next period of a broadcast PRS. Such a reduction may be provided as shown by providing an on-demand NR PRS. Particularly, a UE may send a request that may contain UE-specific parameters. In some cases, a PRS configuration may be tailored to different applications with different accuracy and/or latency requirements. The beams that may need to be used in beam-sweeping may be reduced based on the parameters in the UE request as shown. For example, beams b and d may be used based on a first UE request while beams a and c may be used based on a second UE request as shown. Further, in some cases the UE can also request a stop to the NR PRS further helping reduce overhead usage.

Example of Network Procedures for On-Demand RACH

Aspects of the present disclosure provide techniques and apparatus for providing network procedures for on-demand RACH. For example, one or more cases provide on-demand UE positioning using a PRS.

Figure 10A:
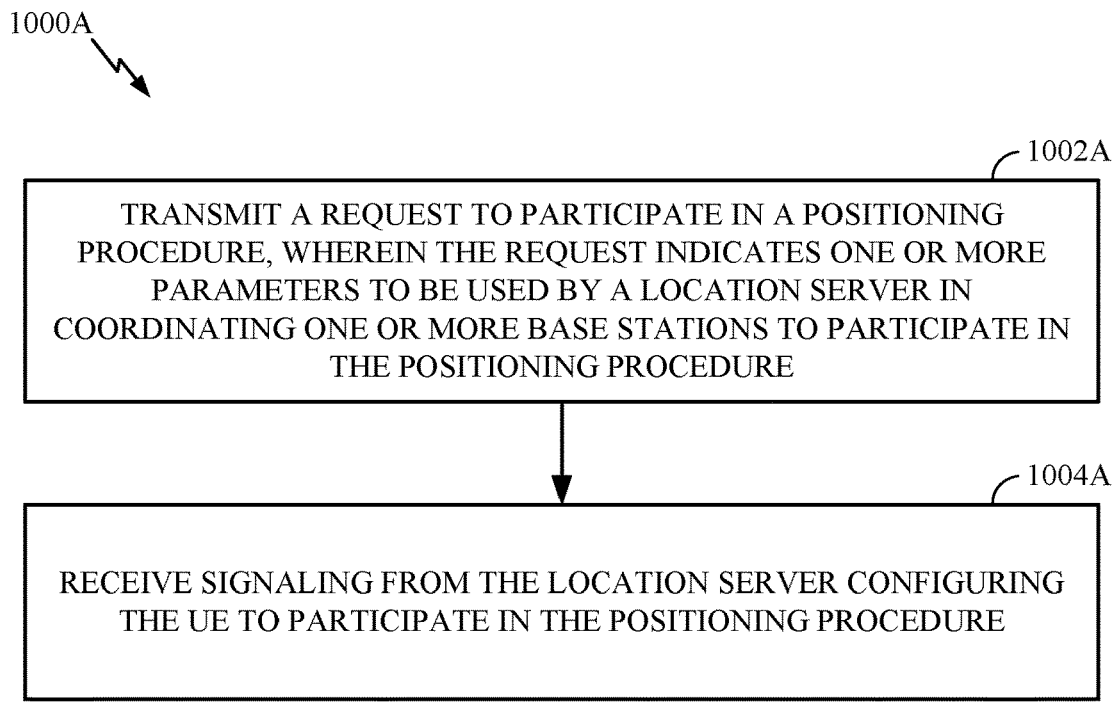
FIG. 10A illustrates example operations for wireless communications by a UE, in accordance with aspects of the present disclosure.

FIG. 10A illustrates example operations 1000A for wireless communications by a UE, in accordance with aspects of the present disclosure. According to certain aspects, operations 1000A may be performed by a user equipment (e.g., one or more of the UEs 120).

Operations 1000A begin, at block 1002A, with the UE transmitting a request to participate in a positioning procedure, wherein the request indicates one or more parameters to be used by a location server in coordinating one or more base stations to participate in the positioning procedure. At 1004A, the UE receives signaling from the location server configuring the UE to participate in the positioning procedure. In some cases, the location server may comprise a location management function (LMF), SMLC (serving mobile location center), e-SMLC (evolved SMLC), or SLP (secure user-plane location platform).

In one or more cases, the one or more parameters indicate resources to use for the UE positioning procedure. In some cases, the one or more parameters may include a desired positioning accuracy or a desired application for using results of the positioning procedure. In some cases, the one or more parameters indicate at least one of a bandwidth (BW) for sending positioning reference signal (PRS) signaling, one or more beams for sending PRS signaling, a number of symbols per slot for PRS signaling, a number of repeated slots for PRS signaling, a number of PRS occasions, a periodicity for sending the PRS signaling, or a comb density of a desired positioning reference signal (PRS) to use for the UE positioning procedure. The one or more parameters may indicate configuration information, from one or more network entities, for configuring positioning reference signal (PRS) signaling.

In some cases, the UE includes a base station almanac (BSA). The BSA includes geographical locations of gNBs. In some cases the geographical locations of gNBs may only include a subset of the overall network of gNBs. For example, the geographical locations of gNBs may only include neighbor gNBs or only gNBs that can communicate with or are in communication with a UE. An additional operation that may be provided includes collecting one or more positioning measurements based on the signaling from the location server. Further, one or more cases may provide operations for determining a position of the UE based at least on the BSA and the one or more positioning measurements. The BSA may be provided to the UE by a network entity, such as a gNB or a location server.

Figure 10B:
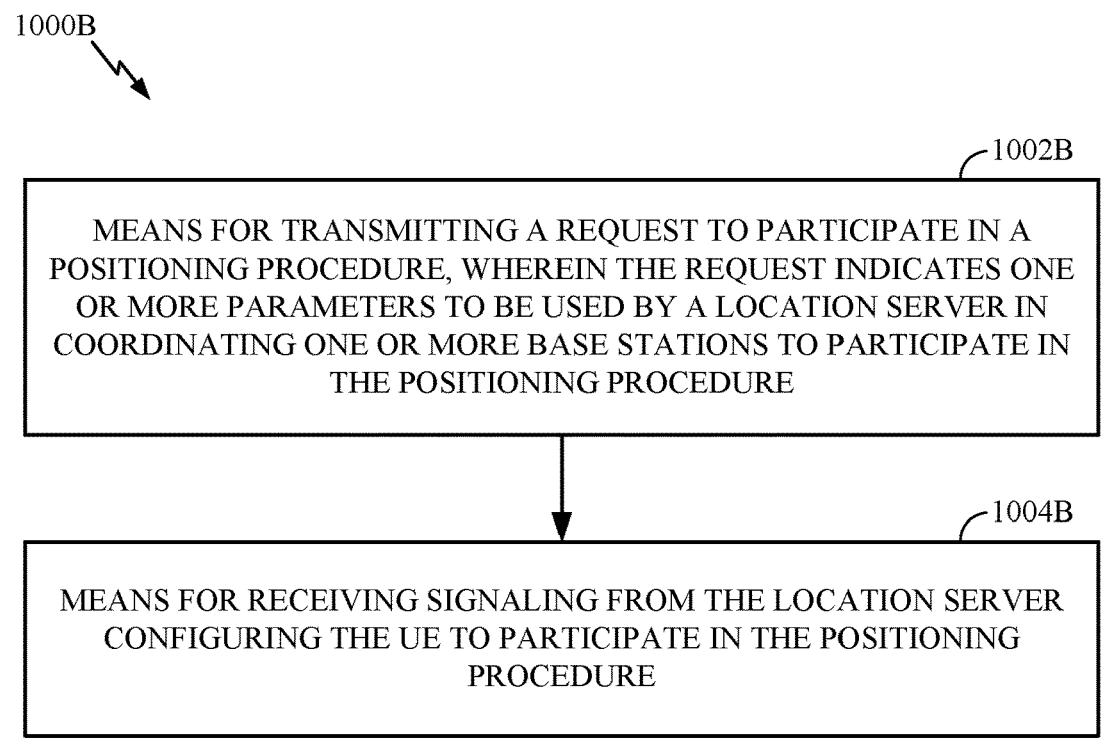
FIG. 10B illustrates example components capable of performing the operations shown in FIG. 10A, in accordance with certain aspects of the present disclosure.

FIG. 10B illustrates example components capable of performing the operations shown in FIG. 10. For example, the apparatus 1000B includes means 1002B for transmitting a request to participate in a positioning procedure, wherein the request indicates one or more parameters to be used by a location server in coordinating one or more base stations to participate in the positioning procedure. The apparatus 1000B further includes means 1004B for receiving signaling from the location server configuring the UE to participate in the positioning procedure.

Figure 11A:
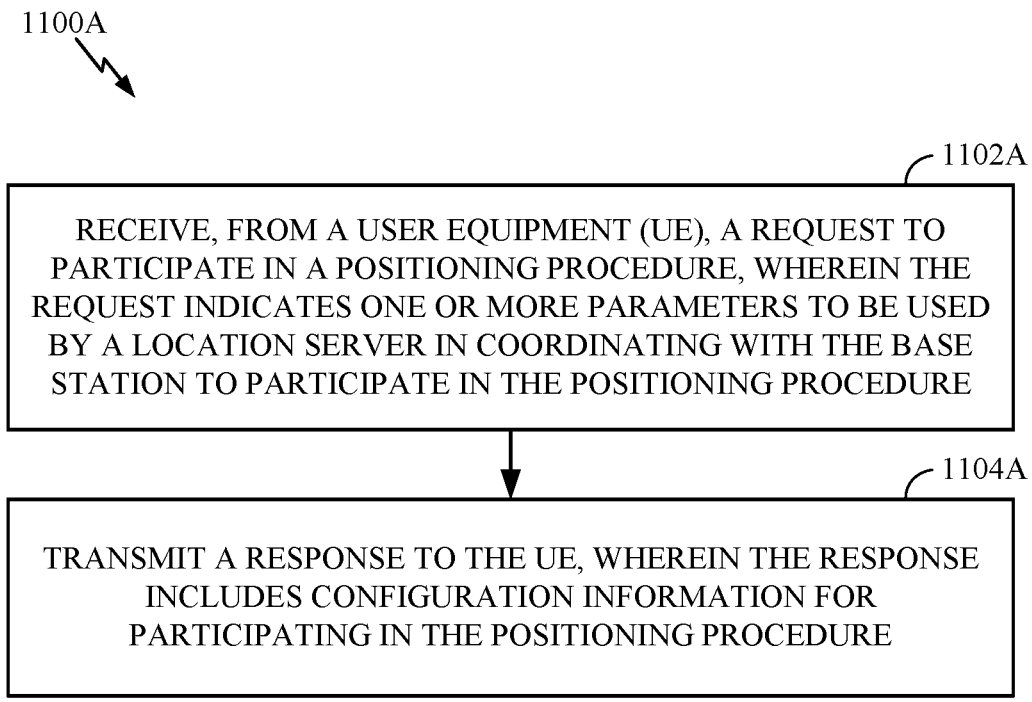
FIG. 11A illustrates example operations for wireless communications by a base station, in accordance with aspects of the present disclosure.

FIG. 11A illustrates example operations 1100A for wireless communications by a base station, in accordance with aspects of the present disclosure. According to certain aspects, operations 1100A may be performed by a BS (e.g., one or more of the BSs 110).

Operations 1100A begin, at block 1102A, with the base station receiving, from a user equipment (UE), a request to participate in a positioning procedure, wherein the request indicates one or more parameters to be used by a location server in coordinating with the base station to participate in the positioning procedure. Operations 1100A further include, at block 1104A, the base station transmitting a response to the UE, wherein the response includes configuration information for participating in the positioning procedure.

In one or more cases, additional operations may be included. For example, operation may be included for modifying the request to include configuration information for configuring positioning reference signal (PRS) signaling, and transmitting the modified request to the location server. This modification may be performed, for example, by the BS including fields in the RRC message that includes the NAS (non-access stratum) container carrying the request message from the UE to the location server. These fields may carry information such as the current PRS configuration of the gNB, and of the neighboring gNBs if available. Whether these fields are included, as well as the content of these fields, may depend on whether the request message in the NAS container is readable by the gNB, and if readable, on the content of the message.

In some cases, the operations may further include receiving, from a location server, signaling configuring the BS to participate in a positioning procedure with a user equipment (UE), and participating in the positioning procedure in accordance with the configuration. In some cases, participating may further include communicating, in response to the request, with one or more base stations or location server. Additionally, another operation that may be included in some cases is transmitting signaling to the UE in response to the request.

In some cases, the BS may include a base station almanac (BSA). In such cases, additional operations may be provided such as receiving a positioning measurement report from the UE, determining a position of the UE based at least on the BSA and positioning measurement report, and transmitting the determined position to the UE. The BSA may be provided to the BS by a network entity such as a location server, or by a neighboring BS. The BSA may be limited to carry information about only the neighboring BS.

Figure 11B:
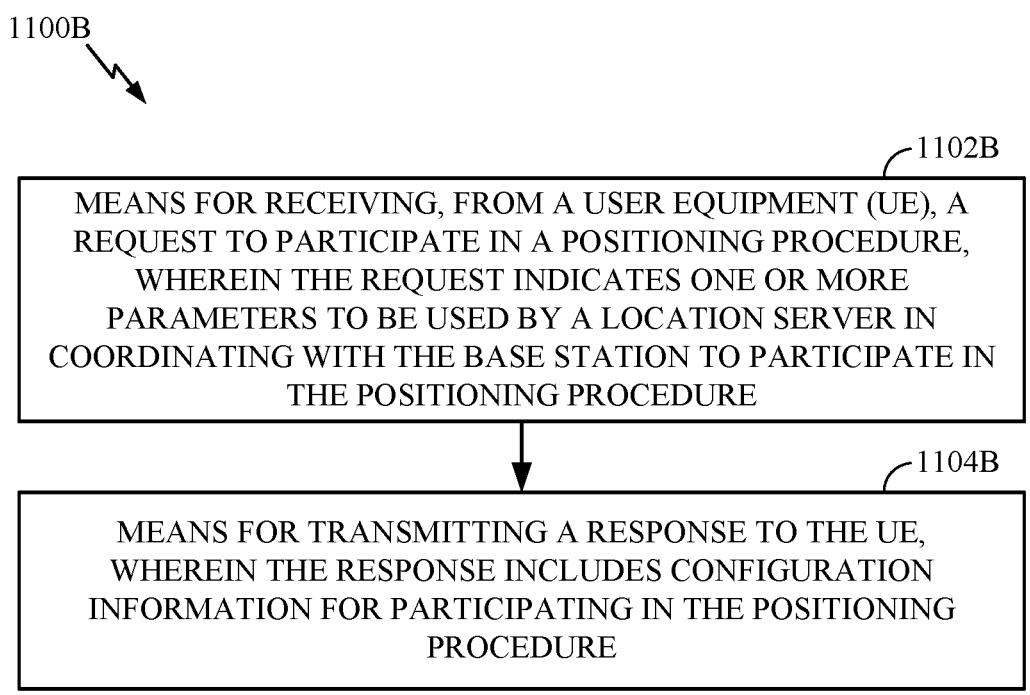
FIG. 11B illustrates example components capable of performing the operations shown in FIG. 11A, in accordance with certain aspects of the present disclosure.

FIG. 11B illustrates example components capable of performing the operations shown in FIG. 11B. For example, the apparatus 1100B includes means 1102B for receiving, from a user equipment (UE), a request to participate in a positioning procedure, wherein the request indicates one or more parameters to be used by a location server in coordinating with the base station to participate in the positioning procedure. The apparatus 1100B further includes means 1104B for transmitting a response to the UE, wherein the response includes configuration information for participating in the positioning procedure.

Figure 12A:
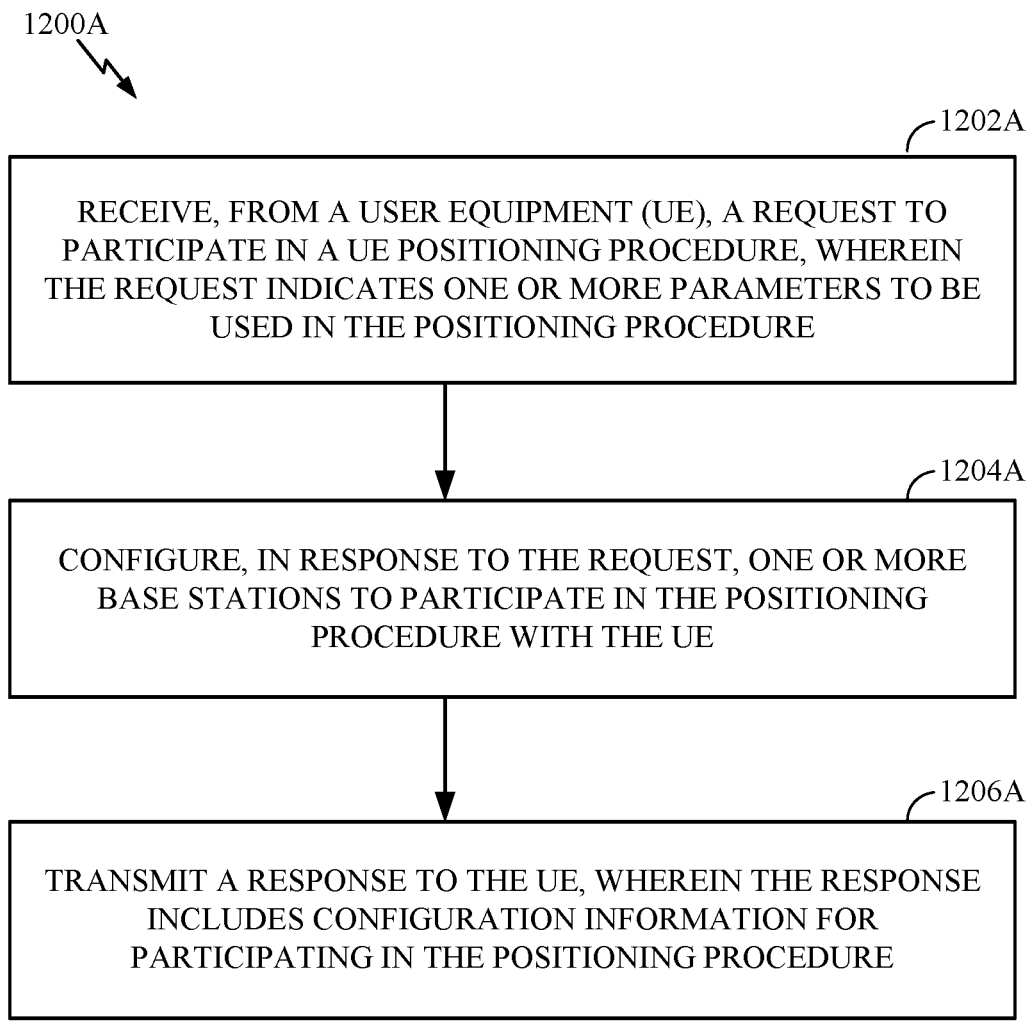
FIG. 12A illustrates example operations for wireless communications by a network entity, in accordance with aspects of the present disclosure.

FIG. 12A illustrates example operations 1200A for wireless communications by a network entity, in accordance with aspects of the present disclosure. Operations 1200A begin, at block 1202A, with the network entity receiving, from a user equipment (UE), a request to participate in a UE positioning procedure, wherein the request indicates one or more parameters to be used in the positioning procedure. Operations 1200A further include, at block 1204A, the network entity configuring, in response to the request, one or more base stations to participate in the positioning procedure with the UE. Further, operations 1200A include, at block 1206A, the network entity transmitting a response to the UE, wherein the response includes configuration information for participating in the positioning procedure.

In some cases, the request from the UE is received via a base station. In some cases, the base station may modify the request by adding additional configuration information, as described above. In some cases additional operation may be included such as receiving a positioning measurement report from the UE, determining a position of the UE based at least on a base station almanac (BSA) and positioning measurement report, and transmitting the determined position to the UE.

Figure 12B:
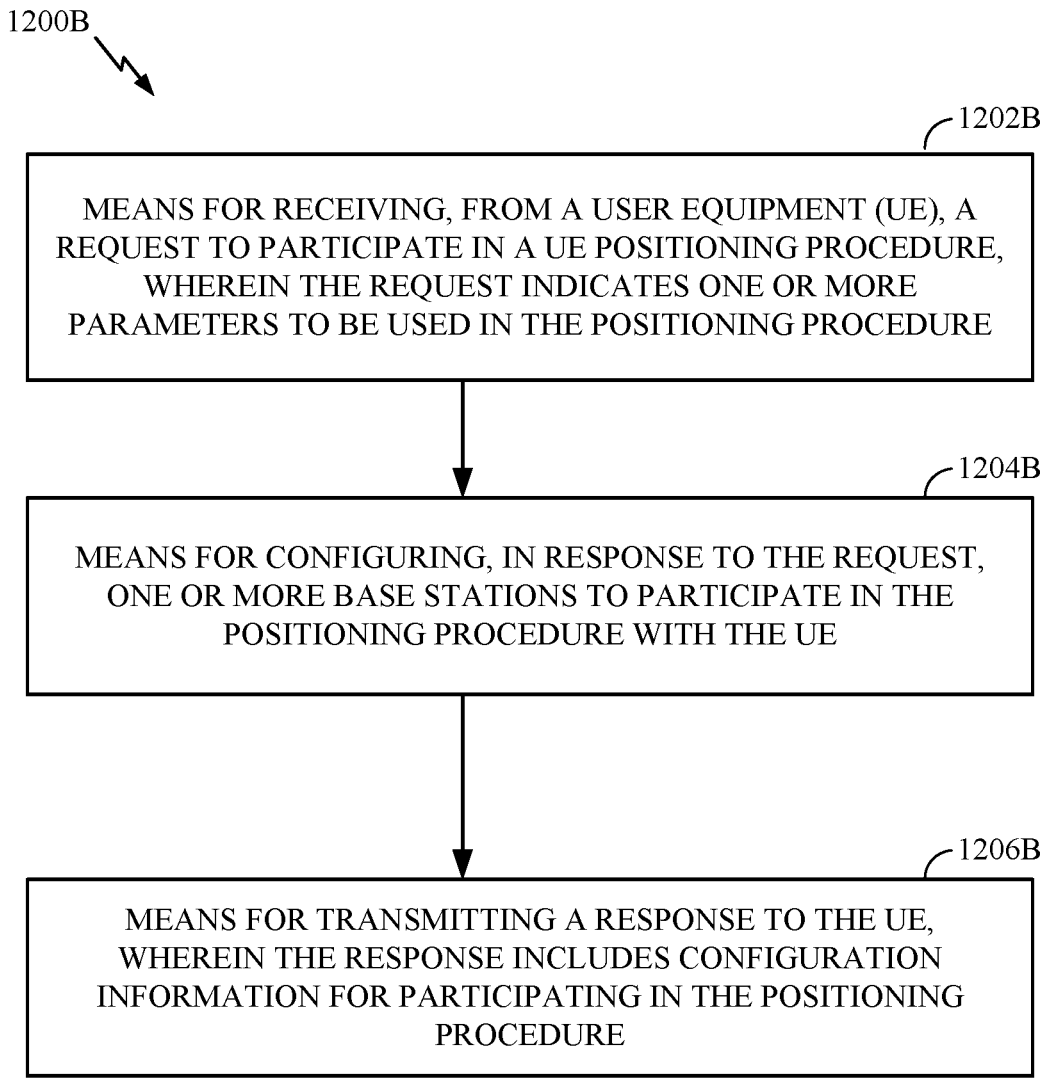
FIG. 12B illustrates example components capable of performing the operations shown in FIG. 12A, in accordance with certain aspects of the present disclosure.

FIG. 12B illustrates example components capable of performing the operations shown in FIG. 12. For example, the apparatus 1200B includes means 1202B for receiving, from a user equipment (UE), a request to participate in a UE positioning procedure, wherein the request indicates one or more parameters to be used in the positioning procedure. The apparatus 1200B further includes means 1204B for configuring, in response to the request, one or more base stations to participate in the positioning procedure with the UE. The apparatus 1200B also includes means 1206B for transmitting a response to the UE, wherein the response includes configuration information for participating in the positioning procedure.

Figure 13A:
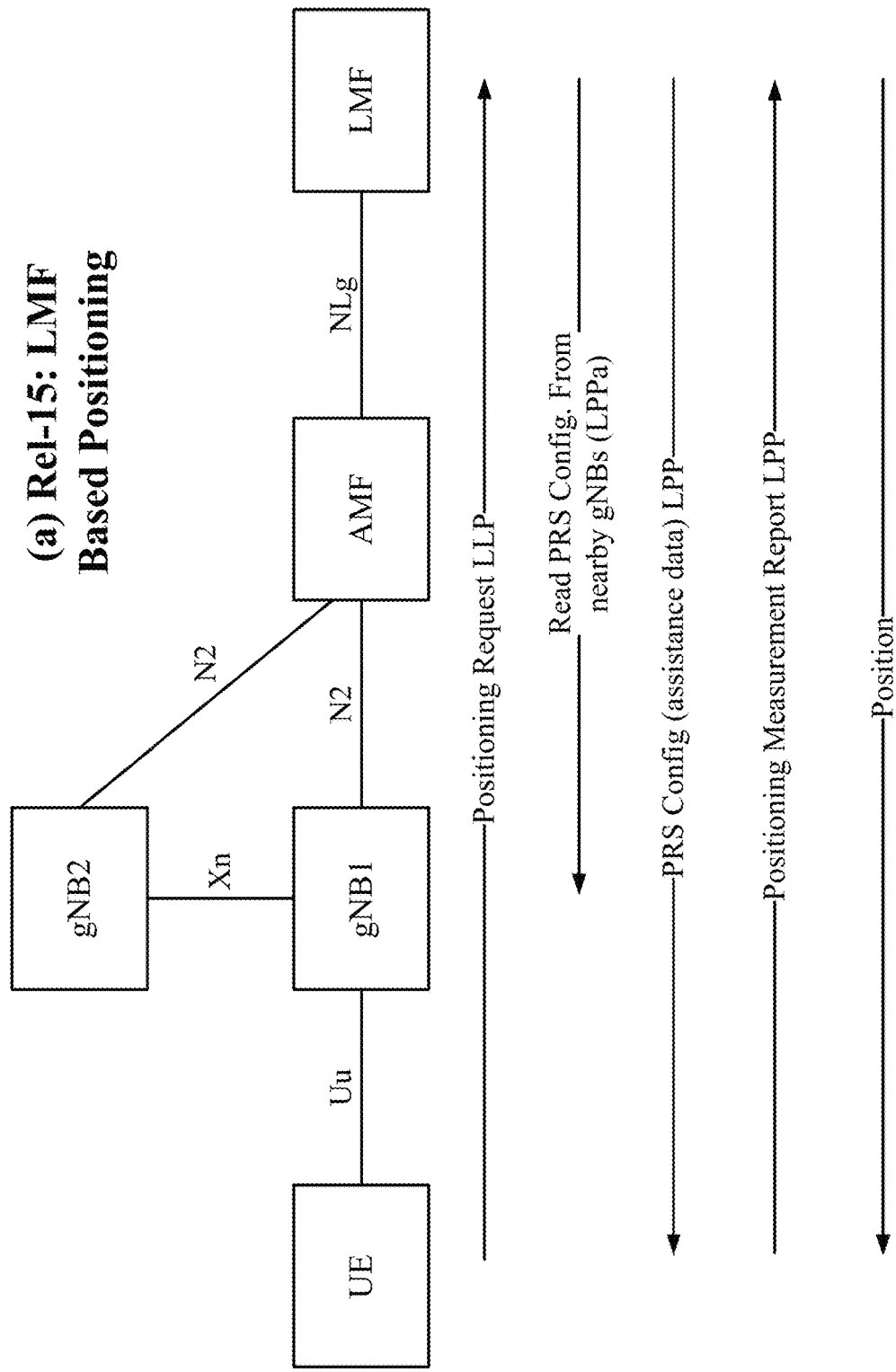
FIG. 13A illustrates an example LMF based positioning, in accordance with aspects of the present disclosure.

FIG. 13A illustrates an example LMF based positioning, in accordance with aspects of the present disclosure. As shown, a UE may transmit a positioning request to an LMF. This positioning request from the UE may be sent using a UE-to-location server protocol such as an LTE positioning protocol (LPP), or an extension of this protocol to 5G NR. In some cases, the LMF may read PRS configuration from nearby gNBs (for example gNB1 and/or gNB2). This ability to read PRS configuration from nearby gNBs by the LMF may be done using a BS-to-location server protocol such as LTE positioning protocol A (LPPa), or an extension of this protocol to 5G NR, such as NR-PPa. The LMF may further transmit the PRS configuration to the UE using the UE-to-location server protocol such as LPP. The PRS configuration may include assistance data. The UE may then generate and transmit a positioning measurement report to the LMF using LPP. The LMF may then calculate and transmit the position of the UE to the UE.

Figure 13B:
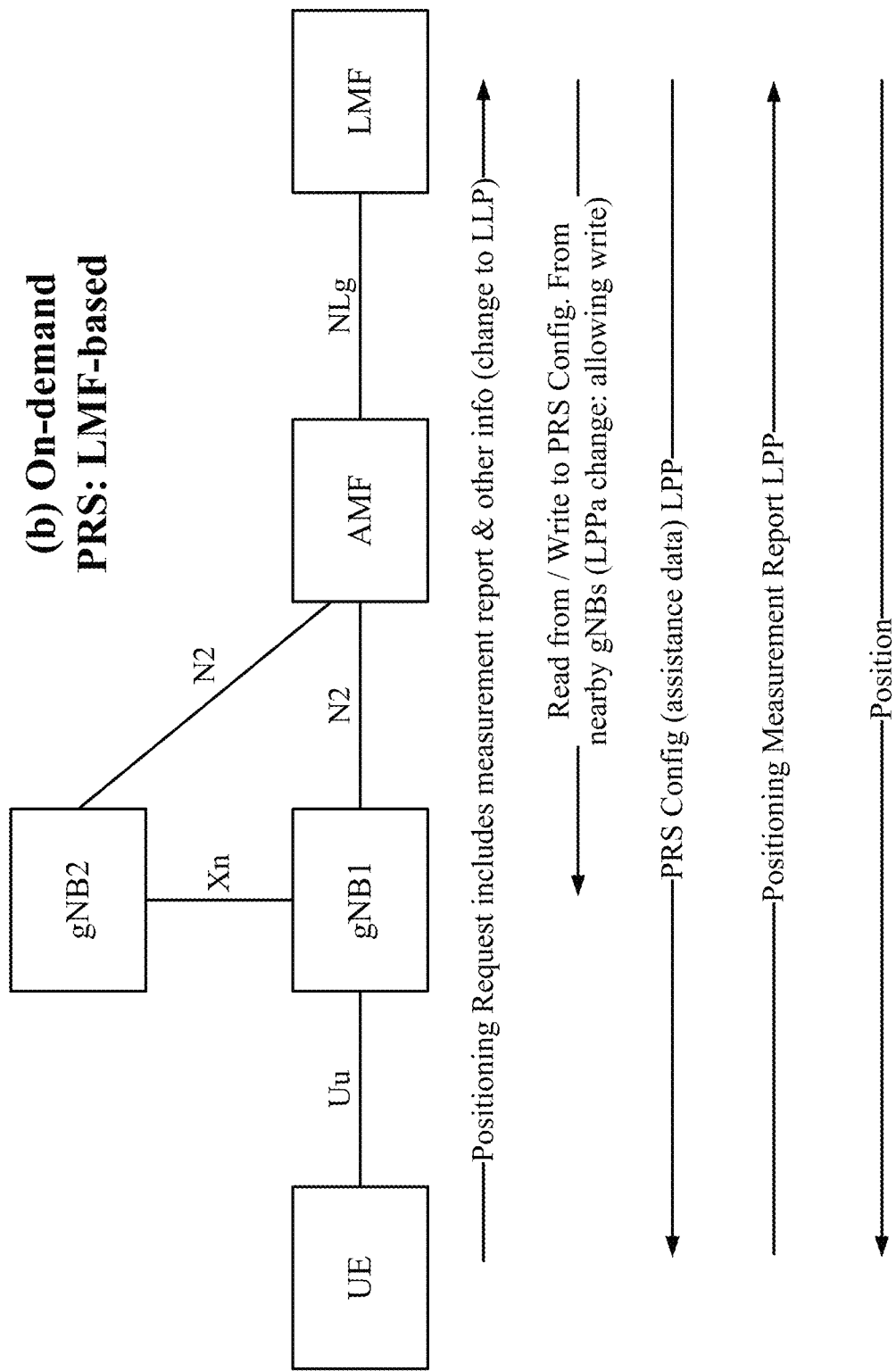
FIG. 13B illustrates an example LMF based on-demand PRS, in accordance with aspects of the present disclosure.

FIG. 13B illustrates an example LMF based on-demand PRS, in accordance with aspects of the present disclosure. As shown, a UE may transmit a positioning request to an LMF. In one or more cases, the position request may further include measurement report and/or other information. This positioning request which include additional information from the UE may be sent using a UE-to-location server protocol such as the LTE positioning rotocol (LPP) or an extension of this protocol to 5G NR. In some cases, the LMF may read PRS configuration from nearby gNBs (for example gNB1 and/or gNB2). Further, in some cases, the LMF can write the PRS configuration for one or more nearby gNBs such as gNB1 and/or gNB2. This ability to read or write PRS configuration from nearby gNBs by the LMF may be done using a BS-to-location server protocol such as LPPa or NR-PPa.

The LMF may further transmit the PRS configuration to the UE using LPP. The PRS configuration may include assistance data. The UE may then generate and transmit a positioning measurement report to the LMF using LPP. The LMF may then calculate and transmit the position of the UE to the UE. In one or more cases, the above noted gNBs as shown in FIGS. 13A and 13B may be eNBs. In some cases, the AMF as shown in FIGS. 13A and 13B may be an MME. In some cases, the LMF as shown in FIGS. 13A and 13B may be an eSMLC. In some cases, the Xn connection between the gNBs as shown in FIGS. 13A and 13B may be X2 connection between eNBs.

In one or more cases, the positioning request that includes additional information may allow for a more customized PRS, which can reduce PRS overhead. In some cases the LMF may therefore be able to activate PRS at the one or more gNB(s) based on the additional information. In some cases, semi-static parameters, such as desired accuracy or PRS BW can be easily carried in contrast with dynamic parameters such as beams which may not be easily carried. This is because of the high signaling overhead for dynamic parameters between UE and LMF. Further, the LMF may have difficulty using the information. In one or more cases, different options for dynamic signaling of customized PRS may also be provided. In some cases, the latency of that which is shown in FIG. 13A and 13B may be the same.

In some cases, additional signaling may be provided by a UE using location-server protocol, such as LPP, for on-demand PRS. For example, a PRS request may include request type parameters. The parameters may include, for example, one or more of a bandwidth (BW) for sending positioning reference signal (PRS) signaling, one or more beams for sending PRS signaling, a number of symbols per slot for PRS signaling, a number of repeated slots for PRS signaling, a number of PRS occasions, a periodicity for sending the PRS signaling, or a comb density of a desired positioning reference signal (PRS) to use for the UE positioning procedure.

In one or more cases, the additional signaling may include a known configuration of PRS or other parameters from neighbor base stations. This information may be obtained by the UE by reading SIBs of neighbor gNB, or from dedicated RRC message from serving cell(s) of same or different serving cell group (secondary cell group (SCG) or master cell group (MCG)). The UE may report this information as additional signaling so that LMF may be able to avoid having to fetch them from the neighbor cells.

In one or more cases, enabling an LPP session that is visible to a gNB may be provided as well. Accordingly, the gNB could then piggyback more configuration information onto the UE's PRS request before forwarding to an LMF, as described in above. This may reduce or eliminate the need for further LPPa or NR-PPa messages. For example, the LMF may be able to skip having to read gNB's PRS configuration in such cases.

In some cases, additional signaling may be provided in protocol, such as LPPa or NR-LPPa, between a gNB and a location server. Such additional signaling may allow the location server to specify the PRS configuration. Further, such additional signaling may allow the location server to turn on/off PRS, instead of just reading the configuration.

Figure 14:
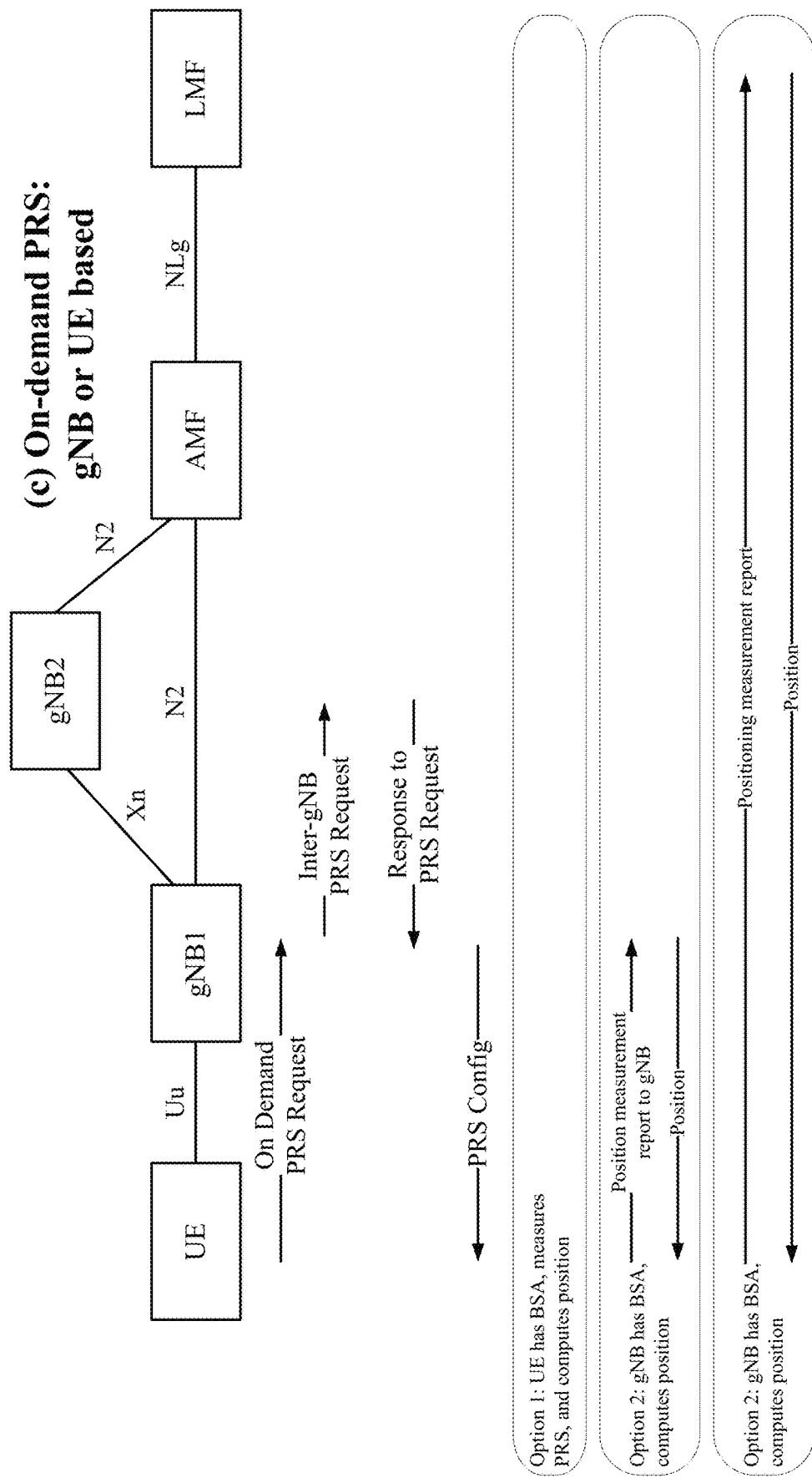
FIG. 14 illustrates an example of gNB or UE based on-demand PRS, in accordance with aspects of the present disclosure.

FIG. 14 illustrates an example of gNB or UE based on-demand PRS, in accordance with aspects of the present disclosure. As shown, a UE may transmit an on-demand PRS request to a gNB1. The gNB1 may then transmit an inter-gNB PRS request and receive a response to the PRS request from one or more other network entities. The UE may then receive a PRS configuration. In one or more cases, a number of different options may be provided for computing the position of the UE.

For example, a first option may include a UE that includes a base station almanac (BSA). Such a UE may measure PRS and compute its own position. According to a second option, one or more of the gNB may have the BSA and may therefore compute the position of the UE. In this second option the UE may therefore generate and transmit a positioning measurement report to the gNB. The gNB will then respond with the calculated position of the UE. Options one and two may substantially improve overall latency, assuming that the BSA is available at gNB or UE. In one or more cases, a gNB and/or UE may only need to know the locations of gNBs relevant to positioning calculation.

A third option may include an LMF that includes the BSA. In this third option the UE may generate and transmit the positioning measurement report to the LMF. The LMF may then determine the position of the UE using the BSA and measurement report. The LMF may then transmit the position to the UE. Overall latency for this third option may still be limited by last communication step between the UE and LMF.

In some cases, an LPP session may be established prior to sending measurement report. In some cases, the LMF may retrieve a gNB's updates to PRS configuration via LPPa or NR-PPa. In some cases a gNB may proactively inform the LMF of updates via LPPa or NR-PPa. According to one or more cases, the gNB or UE based on-demand PRS as shown in FIG. 14 may have less latency to activate PRS than the options shown in FIGS. 13A and 13B. For example, in FIG. 14 a communication path may start with the UE and follow the following path through the different devices: UE→gNB1→gNB2△gNB1→UE. In comparison, a communication path as shown in FIGS. 13A and 13B may start with the UE as well but may follow a path through the devices as follows: UE→LMF→gNBs→LMF→UE. In some cases, a positioning procedure may only allow PRS from Xn-connected neighbors.

In one or more cases, a number of different inter-gNB signaling related to UE's request may be provided. For example, in some cases, a gNB may aggregate requests from multiple UEs. In some cases, a gNB may decide whether to process request with neighbor via Xn or with LMF via LPPa. In some cases, such a decision may depend on relative link delays of Xn vs gNB-LMF link (e.g., is Xn a direct fiber link between gNBs, or a virtual link carried through a core network entity like AMF). For example, if a gNB doesn't have an Xn link to the neighbor that should serve the PRS request: Either establish an Xn link (if the neighbor is known based on cellID or PRS-ID) or use LPPa or NR-PPa to location-server instead.

In some cases, an eNB establishes X2 link when it receives neighbor cell measurement from UE. In some cases such a framework may be extended. For example, an Xn link may be opened based on receiving a PRS request from a neighbor cell that is identified by cellID and/or PRS-ID, which may include PRS beam-ID. In some cases, if an LPP session is readable by a gNB, an Xn link may be established to cells included in measurement reports over the session. In some cases, new signaling (e.g. in Xn) for inter-gNB messaging is only needed to reach non-co-located gNBs. Such signaling may not be needed for multiple sectors of a same base-station, or for a base-station with multiple RRHs.

According to one or more cases, BSA signaling may be provided. For example, some cases may allow a location server to indicate BSA information of a subset of gNBs to gNB or to UE. This information may be included in LPP (e.g., LPPa or NR-PPa). In some cases, a subset may be requested by UE or gNB, or determined by the location server. The information that is included may depend on UE/gNB capability and on a type of positioning request. For example, beam related information, such as the angular spread and boresight pointing direction of each PRS beam, may be included only if UE indicates it can use it for positioning; to avoid unnecessary signaling.

The above-mentioned methods have been described in the context of requests for on-demand PRS transmissions. PRS may be used for observed time difference of arrival (OT-DOA) positioning, in which the location is computed based on the time difference of arrival (TDOA) of the PRS signals at the UE and the locations of the transmission points of the PRS signals. However, it is to be understood that these methods are not limited to OTDOA positioning, and can be used for other location determination schemes such as a scheme based on RTT (round trip time). In RTT scheme, an RTTM (round trip time message) signal is used in place of the PRS signal, and the TDOA report is accompanied by a RTTR (round trip time response) signal which is received by one or more of the transmission points that transmitted the RTTM signal. This allows estimating of "double range", i.e., twice the distance between the UE and the transmission point, which may avoid the need for precise time synchronization between the transmission points. It is evident that the methods described earlier can thus extend to RTT based positioning: In particular, the RTTM signals may be the same as the PRS signals, and the procedures described in processing the UE's measurement reports for OTDOA can be extended to handle the UE's reports accompanying the RTTR signals. Further, the round-trip times computed by the RTTM transmission points (such as base stations) may be passed to a location server (such as an LMF) which computes the position using a BSA.

Figure 15:
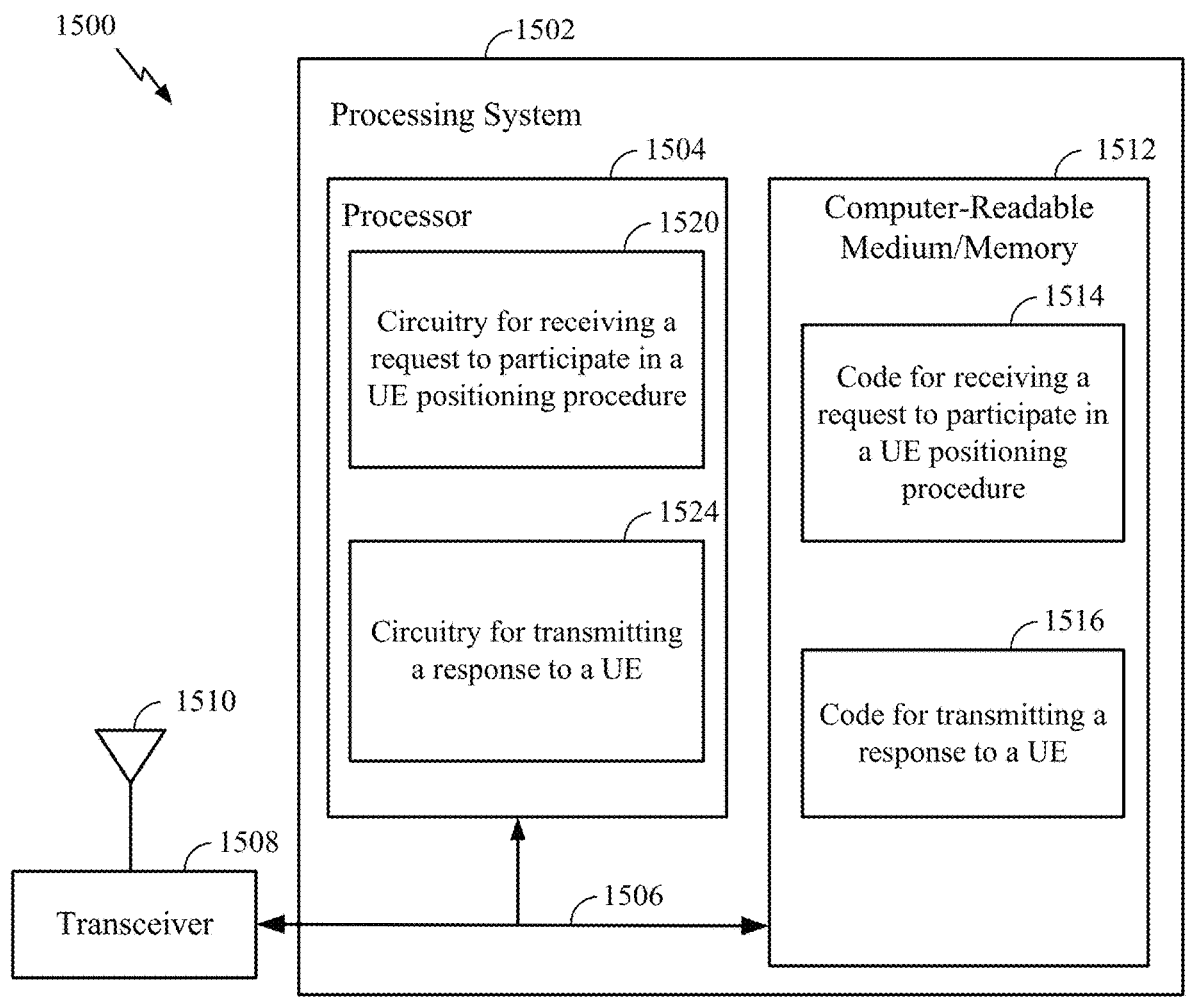
FIG. 15 illustrates a communications device that may include various components configured to perform operations for the techniques disclosed herein.

FIG. 15 illustrates a communications device 1500 that may include various components (e.g., corresponding to means-plus-function components) configured to perform operations for the techniques disclosed herein, such as the operations illustrated in FIGS. 11 and/or 12. The communications device 1500 includes a processing system 1502 coupled to one or more of a transceiver 1508 and a network interface 1526. In some examples, the communications device 1500 may be a base station and/or a location server. For example, the communications device 1500, if utilized as a base station, may include an LMF. In some examples, the communications device 1500 may be utilized as a standalone LMF or base station.

The network interface 1526 is configured to support wireline communication technologies. For example, network interface 1526 may include a modem, network card, chipset, and/or the like. In some examples, network interface 1526 may include one or more input and/or output communication interfaces to permit data to be exchanged with a network, communication network servers, computer systems, and/or any other electronic devices described herein. For example, network interface 1526 may support communication between entities in a core network and a RAN (e.g., between an LMF and a base station). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/ memory 1512 is configured to store instructions (e.g., computer-executable code) that when executed by the processor 1504, cause the processor 1504 to perform the operations illustrated in one or more of FIG. 11 or 12, or other operations for performing the various techniques discussed herein for configuring a UE for participation in a positioning procedure. In certain aspects, computer-readable medium/ memory 1512 stores code 1514 for receiving a request to participate in a UE positioning procedure, and code 1516 for transmitting a response to the UE. In certain aspects, the computer-readable medium/memory 1512 may include a base station almanac (BSA) 1528. For example, the computer-readable medium/memory 1512 may include identification and geographical location for one or more gNBs. In certain aspects, the processor 1504 has circuitry configured to implement the code stored in the computer-readable medium/memory 1512. The processor 1504 includes circuitry 1520 for receiving a request to participate in a UE positioning procedure; and circuitry 1524 for transmitting a response to a UE.

Figure 16:
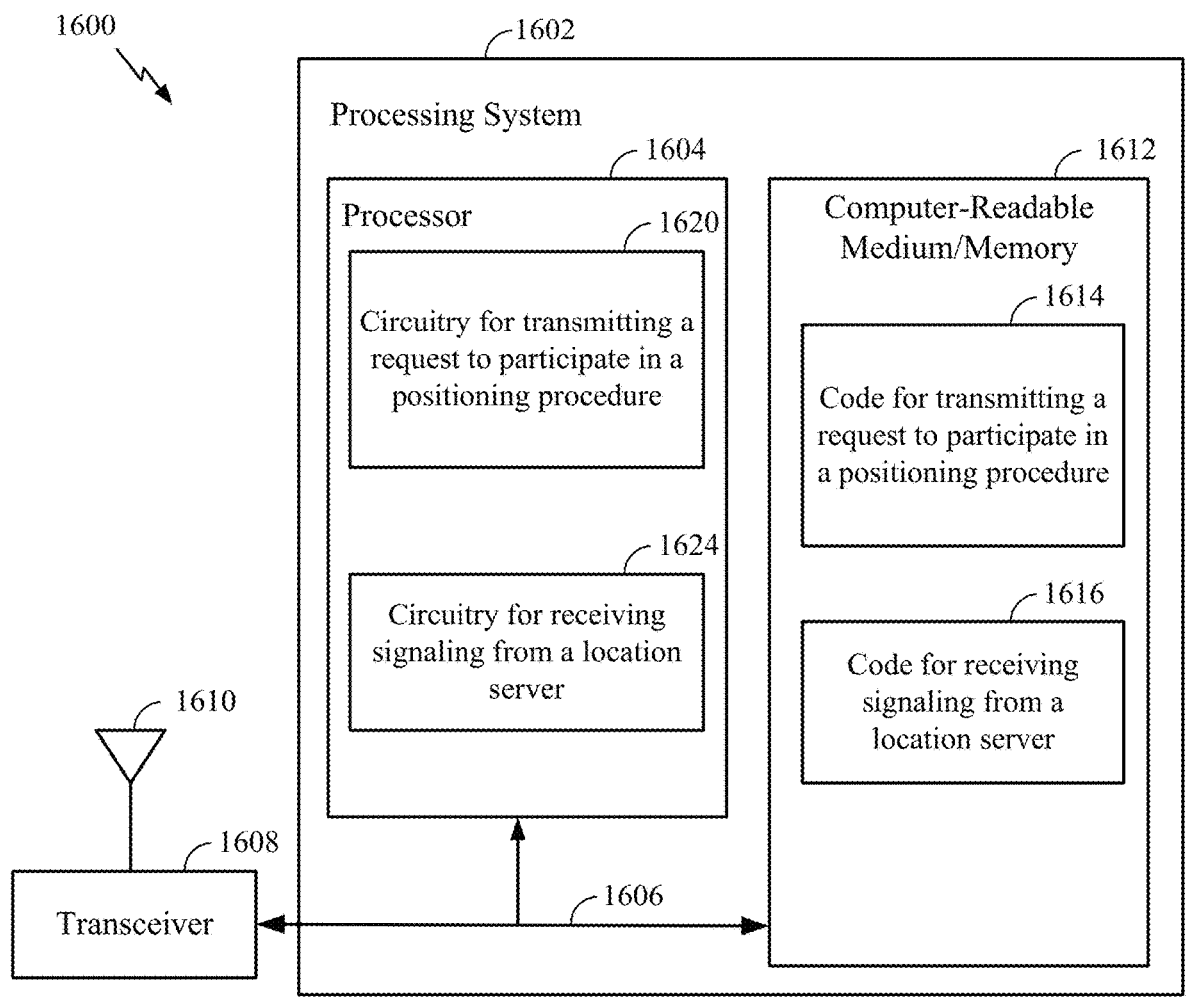
FIG. 16 illustrates a communications device that may include various components configured to perform operations for the techniques disclosed herein.

FIG. 16 illustrates a mobile device 1600 that may include various components (e.g., corresponding to means-plus-function components) configured to perform operations for the techniques disclosed herein, such as the operations illustrated in FIG. 10. In some examples, the mobile device 1600 may be a user equipment (UE). The mobile device 1600 includes a processing system 1602 coupled to one or more transceivers 1608. The one or more transceivers 1608 are configured to transmit and receive signals for the mobile device 1600 via one or more antennas 1610, such as the various signals as described herein.

For example, mobile device 1600 may utilize the one or more antennas 1610 to enable communication with various devices over an air interface. For example, 5G NR specifications provide for UL transmissions from the mobile device 1600 to a base station or a core network entity (e.g., location server), and for DL transmissions from base station 210 to the mobile device 1600, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing is not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, DL transmissions from a base station or core network entity to the mobile device 1600 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The processing system 1602 may be configured to perform processing functions for the mobile device 1600, including processing signals received and/or to be transmitted by the mobile device 1600. The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 10, or other operations for performing the various techniques discussed herein for configuring a UE for participation in a positioning procedure. In certain aspects, computer-readable medium/memory 1612 stores code 1614 for transmitting a request to participate in a positioning procedure, and code 1616 for receiving signaling from a location server. . In certain aspects, the computer-readable medium/memory 1612 may include a base station almanac (BSA) 1628. For example, the computer-readable medium/memory 1612 may include identification and geographical location for one or more gNBs. In certain aspects, the processor 1604 has circuitry configured to implement the code stored in the computer-readable medium/memory 1612. The processor 1604 includes circuitry 1620 for transmitting a request to participate in a positioning procedure; and circuitry 1624 for receiving signaling from a location server.

Additional Considerations

The methods described herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing described herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 1000 illustrated in FIG. 10, operations 1100 illustrated in FIG. 11, and operations 1200 illustrated in FIG. 12 correspond to means 1000A illustrated in FIG. 10A, means 1100A illustrated in FIG. 11A, and means 1200A illustrated in FIG. 12A, respectively.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for configuring, and means for collecting, means for determining, means for modifying, means for participating, and means for communicating may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1); a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 10, 11, and 12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE) comprising:
    transmitting, by the UE, a request to participate in a UE positioning procedure configured to determine a position of the UE, wherein the request indicates one or more parameters to be used by a location server in coordinating one or more base stations (BSs) to participate in the UE positioning procedure, the one or more parameters indicating a number of symbols per slot for positioning reference signal (PRS) signaling, comb density of a desired PRS, a number of PRS occasions, a periodicity for sending the PRS signaling, a bandwidth (BW) for sending the PRS signaling, or one or more beams for sending the PRS signaling, or a combination thereof for configuring the PRS signaling; and
    receiving, by the UE, signaling from the location server configuring the UE to participate in the UE positioning procedure in response to the request.

2. The method of claim 1, wherein the location server comprises a location management function (LMF).

3. The method of claim 1, wherein:
    the one or more parameters indicate resources to use for the UE positioning procedure; and
    the signaling from the location server configuring the UE to participate in the UE positioning procedure comprises a PRS configuration of the one or more BSs.

4. The method of claim 3, wherein the indicated resources comprise a frequency domain resource or a time domain resource, or a combination thereof.

5. The method of claim 1, wherein the one or more parameters include a desired positioning accuracy or a desired application for using results of the UE positioning procedure.

6. The method of claim 1, wherein the one or more parameters indicate a number of repeated slots for the PRS signaling.

7. The method of claim 1, wherein the one or more parameters are configured to tailor the configuration information according to communication requirements of an application operating on the UE, the configuration information for configuring the PRS signaling at the UE.

8. A method for wireless communication by a network entity comprising:
    receiving, from a user equipment (UE), a request to participate in a UE positioning procedure configured to provide the UE with a position of the UE, wherein the request indicates one or more parameters to be used in the UE positioning procedure, the one or more parameters indicating a number of symbols per slot for positioning reference signal (PRS) signaling, comb density of a desired PRS, a number of PRS occasions, a periodicity for sending the PRS signaling, a bandwidth (BW) for sending the PRS signaling, or one or more beams for sending the PRS signaling, or a combination thereof for configuring the PRS signaling;

configuring, in response to the request, one or more base stations (BSs) to participate in the UE positioning procedure with the UE;

transmitting a response to the UE, wherein the response includes configuration information for participating in the UE positioning procedure; and receiving a positioning measurement report from the UE, the positioning measurement report based on the configuration information obtained from the one or more BSs.

9. The method of claim 8, wherein:
the network entity is a BS; and
the request from the UE is received via the BS.

10. The method of claim 9, further comprising:
modifying the request to include configuration information for configuring the PRS signaling; and
transmitting the modified request to a location server.

11. The method of claim 9, further comprising:
receiving, from a location server, signaling configuring the BS to participate in the UE positioning procedure with the UE; and
participating in the UE positioning procedure in accordance with the signaling.

12. The method of claim 11, wherein participating comprises communicating, in response to the request, with the one or more BSs or the location server.

13. The method of claim 9, further comprising transmitting signaling to the UE in response to the request.

14. The method of claim 9, wherein the BS modifies the request by adding additional configuration information.

15. The method of claim 8, wherein the request indicates one or more additional parameters to be used by a location server in coordinating with a BS to participate in the UE positioning procedure.

16. A user equipment (UE) comprising:
a processor;
a transceiver communicatively coupled to the processor; and
a memory communicatively coupled to the processor, wherein the processor is configured to cause the UE to:
transmit a request to participate in a UE positioning procedure configured to determine a position of the UE, wherein the request indicates one or more parameters to be used by a location server in coordinating one or more base stations (BSs) to participate in the UE positioning procedure, the one or more parameters indicating a number of symbols per slot for positioning reference signal (PRS) signaling, comb density of a desired PRS, a number of PRS occasions, a periodicity for sending the PRS signaling, a bandwidth (BW) for sending the PRS signaling, or one or more beams for sending the PRS signaling, or a combination thereof for configuring the PRS signaling; and
receive signaling from the location server configuring the UE to participate in the UE positioning procedure in response to the request.

17. The UE of claim 16, wherein:
the one or more parameters indicate resources to use for the UE positioning procedure; and
the signaling from the location server configuring the UE to participate in the UE positioning procedure comprises a PRS configuration of the one or more BSs.

18. The UE of claim 17, wherein the indicated resources comprise a frequency domain resource or a time domain resource, or a combination thereof.

19. The UE of claim 16, wherein the one or more parameters include a desired positioning accuracy or a desired application for using results of the UE positioning procedure.

20. The UE of claim 16, wherein the one or more parameters indicate a number of repeated slots for the PRS signaling.

21. The UE of claim 16, wherein the one or more parameters are configured to tailor the configuration information according to communication requirements of an application operating on the UE, the configuration information for configuring the PRS signaling at the UE.

22. A network entity comprising:
a processor;
one or more of a transceiver or a network interface communicatively coupled to the processor; and
a memory communicatively coupled to the processor, wherein the processor is configured to cause the network entity to:
receive, from a user equipment (UE), a request to participate in a UE positioning procedure configured to provide the UE with a position of the UE, wherein the request indicates one or more parameters to be used in the UE positioning procedure, the one or more parameters indicating a number of symbols per slot for positioning reference signal (PRS) signaling, comb density of a desired PRS, a number of PRS occasions, a periodicity for sending the PRS signaling, a bandwidth (BW) for sending the PRS signaling, or one or more beams for sending the PRS signaling, or a combination thereof for configuring the PRS signaling;
configure, in response to the request, one or more base stations (BSs) to participate in the UE positioning procedure with the UE;
transmit a response to the UE, wherein the response includes configuration information for participating in the UE positioning procedure; and
receive a positioning measurement report from the UE, the positioning measurement report based on the configuration information obtained from the one or more BS.

23. The method of claim 1, further comprising:
receiving a base station almanac (BSA) from the location server or a BS of the one or more BSs; and
determining a position of the UE based at least on the received BSA and the one or more positioning measurements.

24. The method of claim 1, further comprising:
measuring one or more positioning measurements based on the signaling from the location server; and
determining a position of the UE, based at least on the one or more positioning measurements.

25. The method of claim 1, further comprising:
measuring one or more positioning measurements based on the signaling from the location server; and
sending at least one of the one or more positioning measurements to the location server.

26. The method of claim 9, further comprising:
determining a position of the UE based at least on the positioning measurement report; and
transmitting the determined position to the UE.

27. The UE of claim 16, wherein the processor is further configured to cause the UE to:

measure one or more positioning measurements based on the signaling from the location server; and determine a position of the UE, based at least on the one or more positioning measurements.

28. The UE of claim 16, wherein the processor is further configured to cause the UE to:

measure one or more positioning measurements based on the signaling from the location server; and send at least one of the one or more positioning measurements to the location server.

29. The network entity of claim 22, wherein the processor is further configured to cause the network entity to:

determine a position of the UE based at least on the positioning measurement report; and transmit the determined position to the UE.

30. The method of claim 1, wherein the one or more parameters indicate the comb density of the desired PRS.

31. The method of claim 8, wherein the one or more parameters indicate the comb density of the desired PRS.

32. The UE of claim 16, wherein the one or more parameters indicate the comb density of the desired PRS.

33. The network entity of claim 22, wherein the one or more parameters indicate the comb density of the desired PRS.

34. The method of claim 26, wherein determining the position of the UE further comprises determining the position of the UE based at least on a base station almanac (BSA) and the positioning measurement report, wherein the BS includes the BS.

* * * * *

UNITED STATES PATENT AND TRADEMARK OFFICE
CERTIFICATE OF CORRECTION

| | |
|---|---|
| PATENT NO. | : 11,297,589 B2 |
| APPLICATION NO. | : 16/554342 |
| DATED | : April 5, 2022 |
| INVENTOR(S) | : Sony Akkarakaran et al. |

It is certified that error appears in the above-identified patent and that said Letters Patent is hereby corrected as shown below:

On the Title Page

Item (54) and in the Specification, Column 1, Lines 1-3, TITLE: Should read:
SYSTEMS AND METHODS FOR NETWORK PROCEDURES FOR ON-DEMAND
POSITIONING REFERENCE SIGNAL (PRS)

Signed and Sealed this
Twenty-fourth Day of May, 2022

Katherine Kelly Vidal
*Director of the United States Patent and Trademark Office*